United States Patent
Kawashima et al.

(10) Patent No.: US 7,632,589 B2
(45) Date of Patent: Dec. 15, 2009

(54) FUEL-CELL STACK AND FUEL CELL

(75) Inventors: Tsutomu Kawashima, Nara (JP); Toshimasa Osumi, Shiga (JP); Masatoshi Teranishi, Osaka (JP); Toru Sukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/795,021

(22) PCT Filed: Jan. 13, 2006

(86) PCT No.: PCT/JP2006/300334

§ 371 (c)(1),
(2), (4) Date: Jul. 10, 2007

(87) PCT Pub. No.: WO2006/075681

PCT Pub. Date: Jul. 20, 2006

(65) Prior Publication Data

US 2008/0113243 A1 May 15, 2008

(30) Foreign Application Priority Data

Jan. 14, 2005 (JP) .................... 2005-007377

(51) Int. Cl.
*H01M 8/10* (2006.01)
*H01M 2/00* (2006.01)
*H01M 2/14* (2006.01)
*H01M 8/00* (2006.01)

(52) U.S. Cl. .................. 429/32; 429/34; 429/38; 429/12

(58) Field of Classification Search ........... 429/32, 429/12, 34, 38
See application file for complete search history.

(56) References Cited

U.S. PATENT DOCUMENTS 5,399,184 A * 3/1995 Harada ............... 29/623.4
6,007,933 A 12/1999 Jones
6,010,606 A * 1/2000 Denton et al. ........... 204/284
6,489,051 B1 * 12/2002 Inoue ...................... 429/34
6,720,104 B2 4/2004 Zuber et al.
2003/0209428 A1 11/2003 Hirahara et al.

(Continued)

FOREIGN PATENT DOCUMENTS

| JP | 7-135001 | 5/1995 |
|---|---|---|
| JP | 2002-110198 | 4/2002 |
| JP | 2003-151604 | 5/2003 |
| JP | 2003-173789 | 6/2003 |
| JP | 2003-336145 | 11/2003 |
| JP | 2004-146226 | 5/2004 |

(Continued)

*Primary Examiner*—Patrick Ryan
*Assistant Examiner*—Helen O Chu
(74) *Attorney, Agent, or Firm*—Wenderoth, Lind & Ponack, L.L.P.

(57) ABSTRACT

In a fuel-cell stack in which a plurality of cells are stacked, each of the cells includes a membrane electrode assembly which is composed of a polyelectrolyte membrane and a pair of electrodes sandwiching the polyelectrolyte membrane, and a pair of separators by which the membrane electrode assembly is sandwiched, where the electrodes each have a catalytic layer brought into contact with the polyelectrolyte membrane and a gas diffusion layer brought into contact with the separator, and where a material of the gas diffusion layers is formed from carbon fiber woven cloth. In this fuel-cell stack, the warp direction and weft direction of the carbon fiber woven cloth are so set as to be uniform in all the cells with respect to the primary direction of the gas flow passages of the separators.

13 Claims, 18 Drawing Sheets

U.S. PATENT DOCUMENTS

| | | |
|---|---|---|
| 2004/0131920 A1 | 7/2004 | Yoshida et al. |
| 2004/0157111 A1 | 8/2004 | Sakamoto et al. |
| 2004/0241078 A1 | 12/2004 | Inoue et al. |
| 2005/0042500 A1 * | 2/2005 | Mathias et al. ............ 429/44 |
| 2005/0142430 A1 | 6/2005 | Yoshida et al. |

FOREIGN PATENT DOCUMENTS

| | | |
|---|---|---|
| JP | 2004-185936 | 7/2004 |
| JP | 2004-207231 | 7/2004 |
| JP | 2005-222841 | 8/2005 |
| JP | 2005-268042 | 9/2005 |
| JP | 2005-285757 | 10/2005 |
| WO | 03/034519 | 4/2003 |
| WO | 03/081700 | 10/2003 |

* cited by examiner

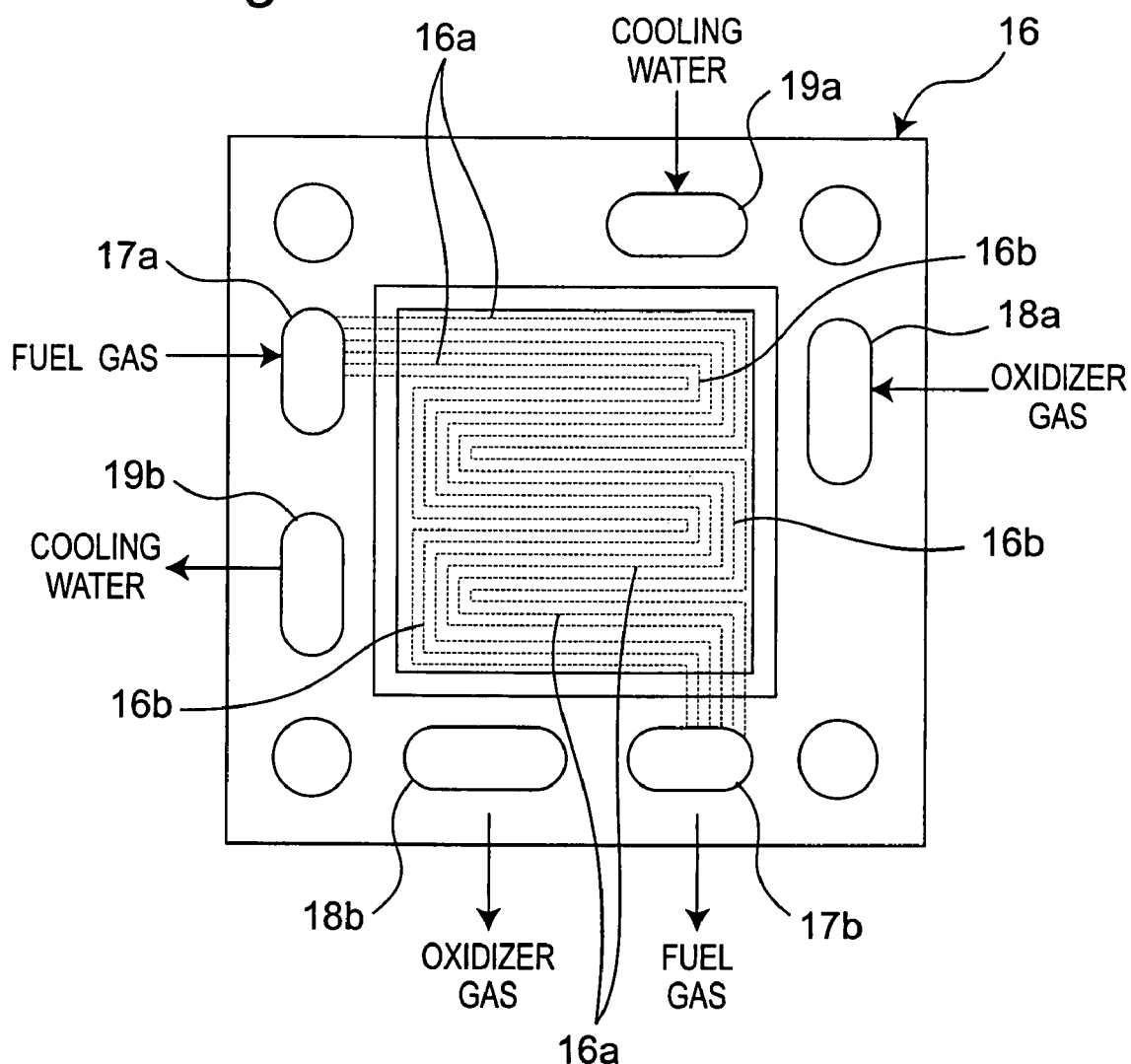

FUEL-CELL STACK AND FUEL CELL

TECHNICAL FIELD

The present invention relates to a fuel cell, as well as a fuel-cell stack, which directly uses, as its fuel, pure hydrogen or modified hydrogen derived from fossil fuels or the like, or liquid fuels such as methanol and ethanol, and which uses air or oxygen as its oxidizer. In particular, the invention relates to a PEFC (Polymer Electrolyte Fuel Cell).

BACKGROUND ART

A fuel cell, e.g. PEFC, acts to make a hydrogen-containing fuel gas and an oxygen-containing oxidizer gas such as air electrochemically react with each other to produce electric power and heat concurrently. With regard to its structure, first, a catalytic reaction layer mainly composed of carbon powder carrying thereon a platinum-based metal catalyst is formed on both surfaces of a polyelectrolyte membrane which selectively transports hydrogen ions. Next, a gas diffusion layer having both gas permeability and electron conductivity is formed on an outer surface of the catalytic reaction layer. This diffusion layer and the catalytic reaction layer (catalytic layer) in combination serve as an electrode. A unit of this electrode and the polyelectrolyte membrane integrated together is referred to as MEA (Membrane Electrode Assembly).

Since such a gas diffusion layer is required to have gas permeability and electron conductivity, the base material therefor is given by the use of a material formed from carbon fiber such as carbon paper, carbon cloth (carbon fiber woven cloth) or carbon felt. On one side of the base material on which it contacts the catalytic layer, a conductive water-repelling layer mainly composed of fluororesin or other water-repelling resin and carbon powder is provided to serve as a gas diffusion layer, generally. The conductive water-repelling layer is effective for moisture retention of the polyelectrolyte membrane, prompt removal of any excess moisture caused by cell reaction, avoidance of any damage of the catalytic layer or the polyelectrolyte membrane that may caused by the base material, i.e., the gas-diffusion-layer base material, and other purposes.

Such a gas-diffusion-layer base material is given commonly by the use of, for example, carbon cloth (hereinafter, referred to as carbon fiber woven cloth) or carbon paper (carbon fiber nonwoven cloth). The carbon fiber woven cloth, which is a woven fabric, is formed by regularly combining together a plurality of yarns, e.g., warp and weft. Also, the carbon fiber nonwoven cloth is formed by irregular dispersion of carbon fiber.

Outside the MEA, conductive plate-shaped separators are placed for mechanical fixation of the MEA and for electrical series connection of neighboring MEAs to each other. At a portion of each separator at which it contacts the MEA, a gas flow passage is formed to serve for the supply of reactant gas to the electrode surface and for carry-off of produced gas and excess gas. The gas flow passage may also be provided independently of the separator, but it is a common method that a groove portion is provided on the surface of the separator to serve as the gas flow passage. Also, in order to prevent fuel gas or oxidizer gas supplied to the gas flow passage from leaking outside or mingling with each other, a gasket is placed around the electrode at an edge portion of the separator or along peripheries of manifolds for the fuel gas or the oxidizer gas. Thus, a unit cell for the fuel cell is made up.

A fuel-cell stack has a layer-stacked structure in which a plurality of such unit cells are stacked in layers and tightened with specified tightening power. Such tightening is intended to reduce the contact resistance between layered members, for example, at the joint portion between the separator and the gas diffusion layer, as well as to maintain the sealability for prevention of leaks of gas and circulating water.

The supply and discharge of fuel gas and oxidizer gas to and from the individual unit cells is performed through fuel-gas inlet manifold and fuel-gas outlet manifold as well as oxidizer-gas inlet manifold and oxidizer-gas outlet manifold formed on side faces of the separator. That is, the fuel gas and the oxidizer gas are supplied together through a fuel-gas and oxidizer-gas inlet formed in an end plate positioned at an end portion of the stack, and transferred dispersively to the MEAs from the inlet manifolds of the cells, respectively, through their respective gas flow passages. After the gases are subjected to electrochemical reaction at the MEAs, unreacted gas is discharged through the outlet manifolds of the cells together from a fuel-gas and oxidizer-gas outlet formed in the end plate.

As shown above, the polymer electrolyte fuel cell adopts a method that fuel gas and oxidizer gas are supplied dispersively in parallel to the individual cells from the manifolds provided at edge portions of the separators. Therefore, in the fuel cell, the gas flow rate for supply to the individual cells may differ from cell to cell if the pressure loss differs from cell to cell due to variations in the sagging amount of the gas diffusion layer into the gas flow passage that is defined by the groove portion of the separator and the gas diffusion layer, or variations in the gas permeability of the gas diffusion layer, or the like. As a result, in cells of smaller gas flow rates, there is a problem of occurrence of a voltage instability phenomenon (flooding) that water droplets block the gas flow passage, causing deficiencies of fuel supply to the electrode and the catalyst located downstream of the place of the blockage so that the voltage decreases gradually and, upon discharge of the water droplets, the blockage of the flow passage is cleared, allowing the fuel supply to recover so that the voltage increases.

As a solution to such a problem, Japanese unexamined patent publication 2003-151604 (Document 1) discloses a fuel cell, as well as a manufacturing method therefor, which is reduced in gas-flow-rate variations among the cells, the flooding thereby having been suppressed, by manufacturing the fuel cell through the steps of measuring the pressure loss for each unit cell, classifying the individual cells into predetermined ranks according to the resulting magnitudes of pressure loss, and collecting unit cells belonging to one rank.

Japanese unexamined patent publication 2004-185936 (Document 2) discloses a fuel cell in which the direction of fibers of the gas-diffusion-layer base material is set parallel to the gas flow direction so that a gas permeability of the gas diffusion layer in a direction perpendicular to the gas flow direction becomes smaller than another gas permeability of the gas diffusion layer in the gas flow direction, thus suppressing any gas leak to neighboring gas flow passages through the gas diffusion layer, with a view to reducing the pressure loss of reactant gas that flows along the gas flow passage, as an attempt at suppression of the flooding.

SUMMARY OF THE INVENTION

Problems to be Solved by the Invention

However, in the method of Document 1, since much time and labor is needed to measure the pressure loss for each unit cell and classify the individual cells into predetermined ranks according to the magnitude of pressure loss on the basis of the measurement results, there is an issue that more cost and time is required, and more production loss is involved, than conventional counterparts.

Also, in the method of Document 2, since the primary direction of fibers in the gas-diffusion-layer base material is parallel to the primary direction of the gas flow passage, the gas-diffusion-layer base material becomes lower in rigidity in the direction perpendicular to the gas flow passage. As a result, it becomes more likely that the gas-diffusion-layer base material sags into the gas flow passage. Thus, there is an issue that variations in pressure loss among the cells cannot be reduced because of variations in the sagging amount of the gas diffusion layer into the gas flow passage among the cells and the like, contrarily giving an obstacle to improvement of the anti-flooding property.

Accordingly, an object of the present invention, lying in solving these and other issues, is to provide a fuel-cell stack and a fuel cell which are smaller in production loss, reduced in variations in pressure loss among the cells, and equalized in gas flow rate among the cells so that the anti-flooding property is enhanced.

Means for solving the Subject

In order to accomplish these and other aspects, the present invention has the following constitutions.

According to a first aspect of the present invention, there is provided a fuel-cell stack having a layer-stacked structure of a first cell and a second cell, the fuel-cell stack comprising:

a membrane electrode assembly (MEA) which is a assembled member having a polyelectrolyte membrane, catalytic layers placed so as to sandwich the polyelectrolyte membrane, and gas diffusion layers placed outside the catalytic layers, respectively, and in which anode and cathode electrodes are formed; and a pair of separator having groove portions formed on surfaces thereof, which are placed so as to interpose the membrane electrode assembly therebetween and to form gas flow passages by bringing the surfaces into contact with the gas diffusion layers, wherein between the first cell and the second cell, elongation variations of a gas-diffusion-layer base material that forms the gas diffusion layer of either one electrode of the anode or the cathode (between the respective cells) falls within ±30% with respect to a direction perpendicular to a primary direction of the gas flow passages of the separators.

According to a second aspect of the present invention, there is provided the fuel-cell stack as defined in the first aspect, wherein in the first cell and the second cell, the either one electrode is the anode.

According to a third aspect of the present invention, there is provided the fuel-cell stack as defined in the first aspect, wherein between the first cell and the second cell, the elongation variations of the gas-diffusion-layer base materials of the anode and the cathode, respectively, are within ±30% with respect to the perpendicular direction.

According to a fourth aspect of the present invention, there is provided the fuel-cell stack as defined in the first aspect, wherein the elongation variations are within ±30% also with respect to the primary direction of the gas flow passages of the separators.

According to a fifth aspect of the present invention, there is provided the fuel-cell stack as defined in first aspect, wherein the elongation variations are within ±10% with respect to the perpendicular direction.

According to a sixth aspect of the present invention, there is provided the fuel-cell stack as defined in the fifth aspect, wherein the elongation variations are within ±20% also with respect to the primary direction of the gas flow passages of the separators.

According to a seventh aspect of the present invention, there is provided the fuel-cell stack as defined in the first aspect, wherein the gas-diffusion-layer base materials of the first cell and the second cell, respectively, each have an anisotropy in elongation between a direction along the primary direction of the gas flow passages and the perpendicular direction.

According to an eighth aspect of the present invention, there is provided the fuel-cell stack as defined in the seventh aspect, wherein the anisotropy in elongation is that an elongation of a larger-elongation direction is 60% or more larger than an elongation of a smaller-elongation direction.

According to a ninth aspect of the present invention, there is provided the fuel-cell stack as defined in the seventh aspect, wherein a smaller-direction direction of the gas-diffusion-layer base materials is placed along a direction perpendicular to the primary direction of the gas flow passages of the separators.

According to a tenth aspect of the present invention, there is provided the fuel-cell stack as defined in the first aspect, wherein the gas-diffusion-layer base materials are formed from carbon fiber woven cloth.

According to an eleventh aspect of the present invention, there is provided a fuel cell including the fuel-cell stack as defined in any one of the first to tenth aspects, and a common fuel supply unit for feeding to both the first cell and the second cell of the stack.

EFFECTS OF THE INVENTION

According to the present invention, in a fuel-cell stack in which a first cell and a second cell are stacked, elongation variations among the cells of the gas-diffusion-layer base material that forms the gas diffusion layer of either one electrode of the anode or the cathode in each cell are limited to within ±30% with respect to a direction perpendicular to the primary direction of the gas flow passages of the separators. Therefore, it becomes achievable to reduce variations among the cells in the sagging amount of the gas-diffusion-layer base material into the gas flow passages of the separators and to thereby reduce pressure loss variations among the cells. As a result, it becomes achievable to distribute gas uniformly to the cells in the fuel-cell stack having a stacked structure of a plurality of unit cells. Thus, there can be provided a fuel-cell stack which is high in anti-flooding property, as well as a fuel cell which includes such a fuel-cell stack.

BRIEF DESCRIPTION OF DRAWINGS

These and other aspects and features of the present invention will become clear from the following description taken in conjunction with the preferred embodiments thereof with reference to the accompanying drawings, in which:

FIG. 3 is a schematic plan view of a separator;

DETAILED DESCRIPTION OF THE INVENTION

Figure 1:
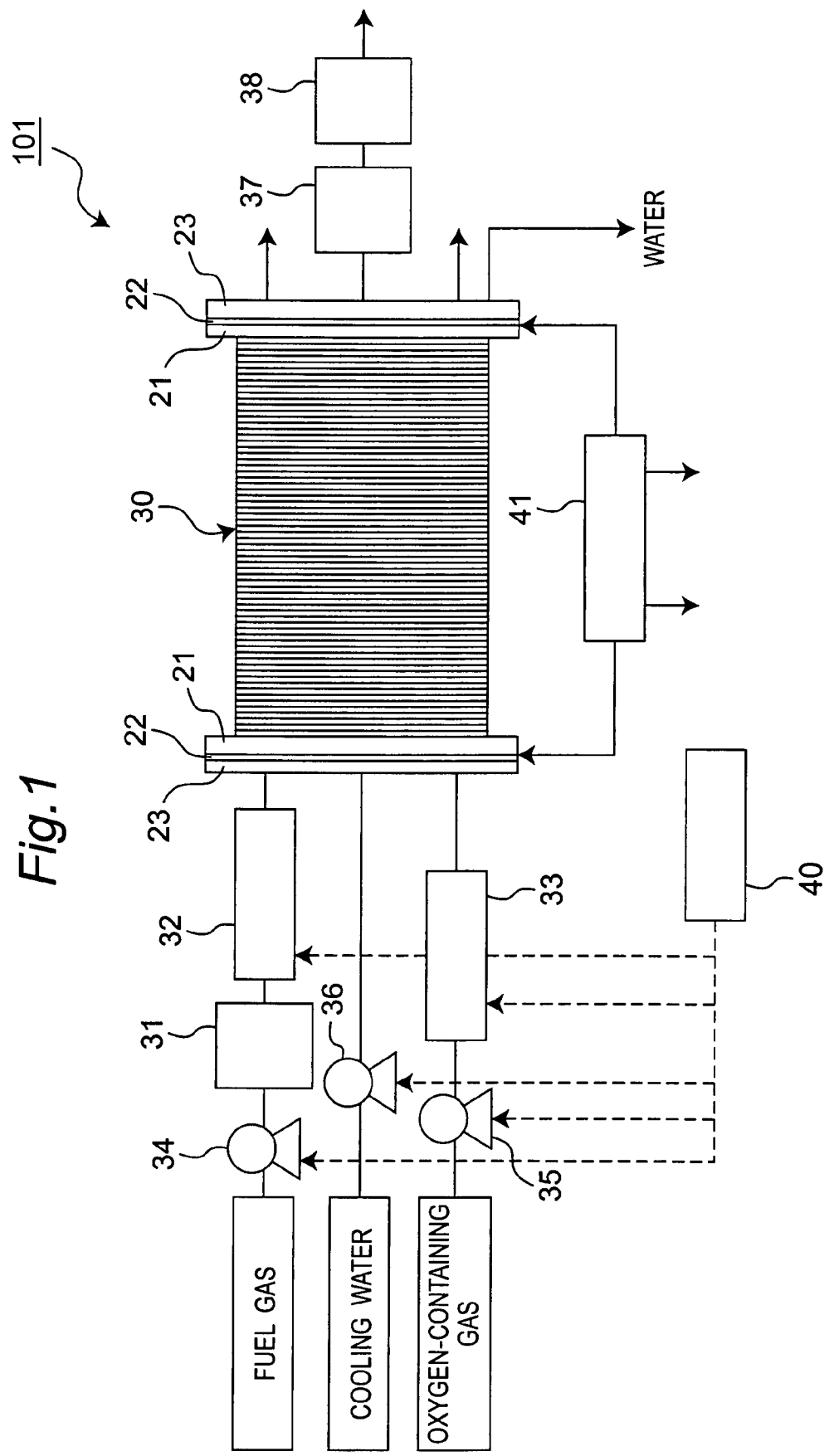
FIG. 1 is a schematic constructional view showing a construction of a fuel cell according to one embodiment of the present invention.

Before the description of the present invention proceeds, it is to be noted that like parts are designated by like reference numerals throughout the accompanying drawings.

Hereinbelow, an embodiment of the present invention will be described in detail with reference to the accompanying drawings.

Figure 2:
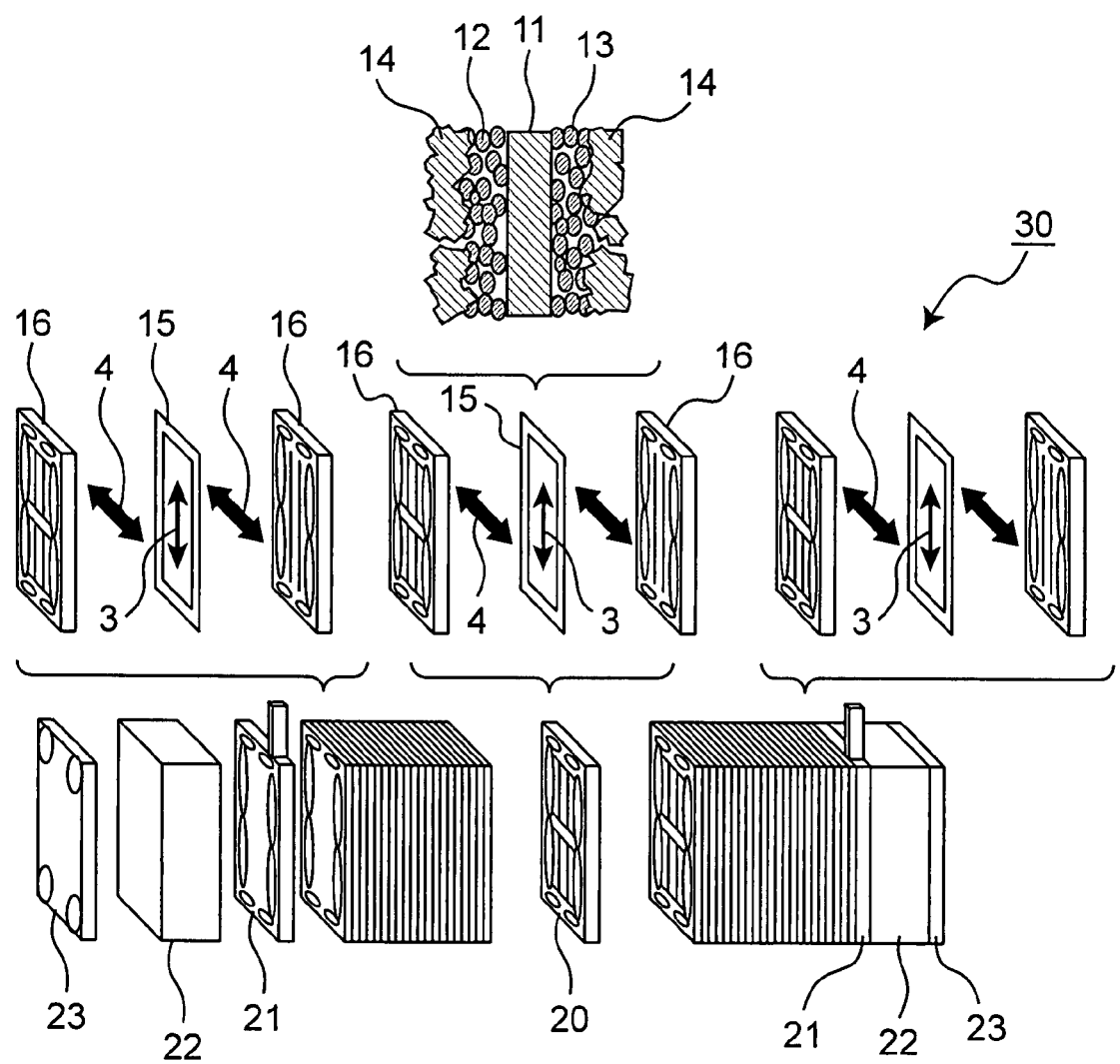
FIG. 2 is a schematic exploded view of a fuel-cell stack included in the fuel cell of FIG. 1.

FIG. 1 is a schematic constructional view showing a schematic construction of a fuel cell including a fuel-cell stack according to one embodiment of the present invention. FIG. 2 is a schematic exploded view of a fuel-cell stack (hereinafter, referred to as a stack) included in the fuel cell 101 shown in FIG. 1.

The fuel cell 101 is a polymer electrolyte fuel cell (PEFC), as an example, which works to make a hydrogen-containing fuel gas and an oxygen-containing oxidizer gas such as air electrochemically react with each other to produce electric power, heat and water at the same time. As shown in FIG. 1, the fuel cell 101 includes a stack 30 having a layer-stacked structure in which a plurality of fuel-cell use cells (or unit cells) each having an anode-and-cathode pair of electrodes are connected in series, a fuel processor 31 for extracting hydrogen from fuel gas, an anode humidifier 32 for humidifying hydrogen-containing fuel gas extracted by the fuel processor 31 to improve the power generation efficiency, a cathode humidifier 33 for humidifying oxygen-containing gas (oxidizer gas), and pumps 34, 35 for supplying fuel gas and oxygen-containing gas, respectively. That is, the fuel processor 31, the anode humidifier 32 and the pump 34 constitute a fuel feeder unit for feeding the fuel gas to the individual cells of the stack 30, while the cathode humidifier 33 and the pump 35 constitute an oxidizer feeder unit for feeding oxidizer gas to the individual cells of the stack 30. It is noted that the fuel feeder unit and the oxidizer feeder unit may also be provided in other various modes only if they have the function of feeding the fuel or the oxidizer, but, in this embodiment, a feeder unit that feeds fuel or oxidizer commonly to a plurality of cells included in the stack 30 allows later-described effects of this embodiment to be preferably obtained.

The fuel cell 101 further includes a pump 36 for circulatively feeding cooling water for use of efficient removal of heat generated in the stack 30 during power generation, a heat exchanger 37 for subjecting the heat removed by the cooling water (e.g., a liquid having no electrical conductivity such as pure water) to heat exchange with a fluid such as tap water, and a hot water storage tank 38 for storing therein tap water subjected to the heat exchange. Furthermore, the fuel cell 101 has an operation control unit 40 for performing operation control for use of power generation while holding those individual constituent members associated with one another, and an electricity output section 41 for extracting electricity generated in the stack 30.

As shown in FIG. 2, the stack 30 included in the fuel cell 101 is made up by stacking a plurality of unit cells 20, each of which forms a fundamental unit structure, and by tightening current collector plates 21, insulating plates 22 and end plates 23 from both sides of the stack with a specified load. Each of the current collector plates 21 has a current-extracting terminal portion 21a, from which an electric current, i.e. electricity, is taken out during power generation. The insulating plates 22 insulate the current collector plates 21 and the end plates 23, respectively, from each other, and may, in some cases, be equipped each with unshown introductory port and discharge port for gas and cooling water. The end plates 23 tighten and hold the plurality of stacked unit cells 20, the current collector plates 21 and the insulating plates 22 with a specified load by means of unshown pressurizing means.

As shown in FIG. 2, each unit cell 20 is made up by sandwiching an MEA (Membrane Electrode Assembly) 15 with a pair of separators 16. The MEA 15 is formed through the steps of forming a catalytic layer (anode-side catalytic layer) 12 composed mainly of carbon powder carrying thereon a platinum-ruthenium alloy catalyst on the anode side of a polyelectrolyte membrane 11 that selectively transports hydrogen ions, forming a catalytic layer (cathode-side catalytic layer) 13 composed mainly of carbon powder carrying thereon a platinum catalyst on the cathode side, and placing, on outer surfaces of those catalytic layers 12 and 13, gas diffusion layers 14 having both fuel-gas or oxidizer-gas permeability and electron conductivity. For the polyelectrolyte membrane 11, a solid polymer material showing proton conductivity, for example, perfluorosulfonic acid membrane (Nafion membrane made by DuPont) is commonly used.

The separator 16 (or both separators 16) needs only to be made of a gas-impermeable conductive material and, for example, such materials as a resin-impregnated carbon material cut into a specified configuration or a mixture of carbon powder and resin material are commonly used. Recessed groove portions are formed at portions of the separator 16 at which it contacts the MEA 15. Contact of the groove portions with the gas diffusion layer 14 forms gas flow passages for feeding the fuel gas or the oxidizer gas to the electrode surface and for carrying away any excess gas. Further, the gas flow passages 16a formed on the surface of the separator 16 as shown above are so formed as to be, for example, in such a serpentine shape that, as shown in the schematic plan view of the separator 16 of FIG. 3, a singularity or plurality of paths (gas flow passages) 16a directed from inlet toward outlet are disposed with plural times of turns along the horizontal direction in the figure. The serpentine-shaped gas flow passages 16a have a seriated structure that forward paths and return paths formed parallel to each other are coupled at their end portions to each other at turn portions 16b, respectively. It is noted that the terms "primary direction of gas flow passages" herein refers to a direction of the gas flow passages 16a in their linear portions and, for example, the primary direction of the gas flow passages 16a in the separator 16 shown in FIG. 3 refers to the horizontal direction as viewed in the figure.

On a one-side surface of the separator 16 opposite to the side on which the gas flow passages are provided are formed flow passages for the cooling water. Also, at edge portions of the separator 16, a fuel-gas inlet manifold 17a and a fuel-gas outlet manifold 17b as well as an oxidizer-gas inlet manifold 18a and an oxidizer-gas outlet manifold 18b are formed for supply and discharge of the fuel gas and the oxidizer gas to the unit cells 20, and in addition to this, a cooling-water inlet manifold 19a and a cooling-water outlet manifold 19b are also formed. Therefore, in the fuel cell 101 in which a plurality of unit cells 20 are stacked, the fuel-gas inlet manifold 17a, the fuel-gas outlet manifold 17b, the oxidizer-gas inlet manifold 18a, the oxidizer-gas outlet manifold 18b, the cooling-water inlet manifold 19a and the cooling-water outlet manifold 19b are communicated through all the unit cells 20. It is noted that unshown seal members are set in the separators 16, the current collector plates 21, the insulating plates 22 and the end plates 23 so that the fuel gas and the oxidizer gas or the like can be prevented from being mixed together or leaked outside.

Figure 4A:
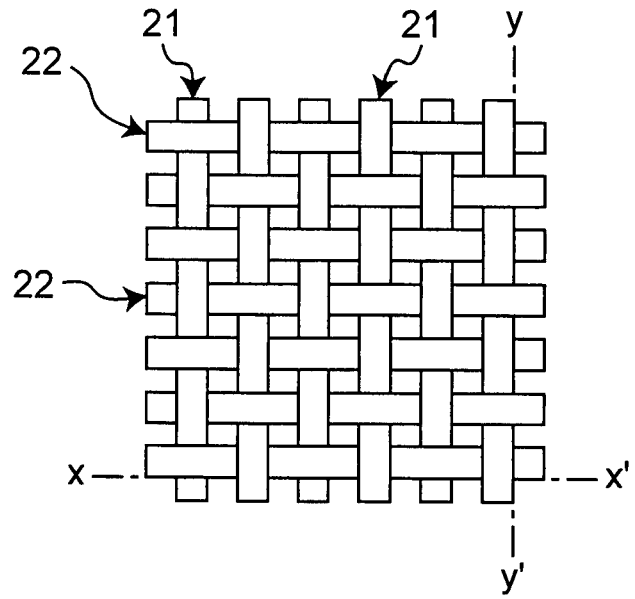
FIG. 4A is a schematic plan view showing a structure of carbon fiber woven cloth (plain weave) from which the gas-diffusion-layer base material included in the stack is formed.
Figure 4B:
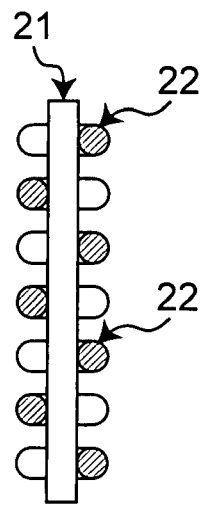
FIG. 4B is a schematic sectional view showing a y-y' cross section of the carbon fiber woven cloth of the gas-diffusion-layer base material of FIG. 4A.
Figure 4C:
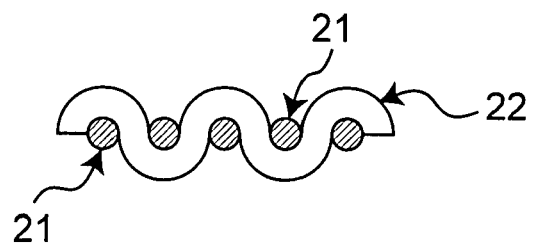
FIG. 4C is a schematic sectional view showing an x-x' cross section of the carbon fiber woven cloth of the gas-diffusion-layer base material of FIG. 4A.

For the gas diffusion layer 14 (or for each gas diffusion layer 14), a base material formed from carbon fiber can generally be used and, for example, carbon fiber woven cloth can be used as such a base material. The carbon fiber woven cloth has a woven fabric structure using carbon fiber yarns as its constituent material, and such a woven fabric structure is given most commonly by a plain weave structure shown in the partly enlarged schematic plan view of the gas diffusion layer (base material) 14 of FIG. 4A. The plain weave structure is so structured that warp 21 placed along the vertical direction and weft 22 placed along the horizontal direction, as viewed in the figure, are three-dimensionally interlaced alternately, a cross section being so structured that the weft 22 are interlaced with the warp 21, respectively, as shown in FIG. 4B (y-y' cross section) and FIG. 4C (x-x' cross section). The carbon fiber woven cloth, from which the gas diffusion layer 14 of this embodiment is formed, is anisotropic in that elongation or tensile strength differs between the placement direction of the warp 21 and the placement direction of the weft 22.

Here are described a placement relationship between the placement direction of the warp 21 or the weft 22 of the gas-diffusion-layer base material 14 composed of a carbon fiber woven cloth having such an anisotropy as shown above and the primary direction of the gas flow passages 16a in the separators 16.

Figure 5A:
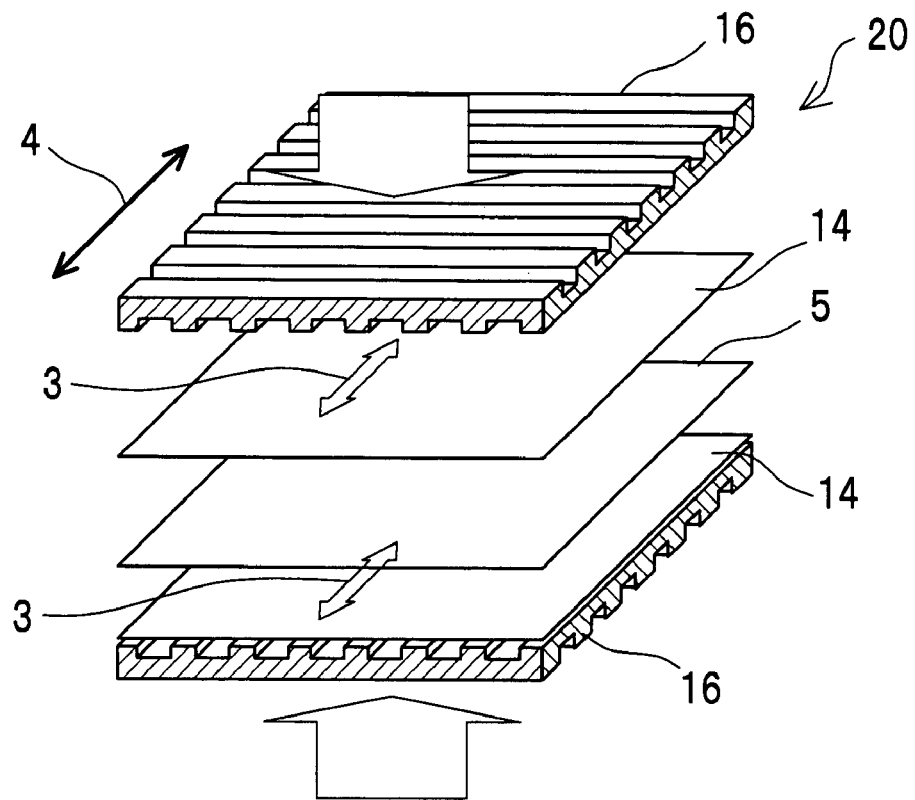
FIG. 5A is a schematic exploded view of a unit cell in which the warp direction of the carbon fiber woven cloth and the primary direction of the gas flow passage of the separator are set parallel to each other.
Figure 5B:
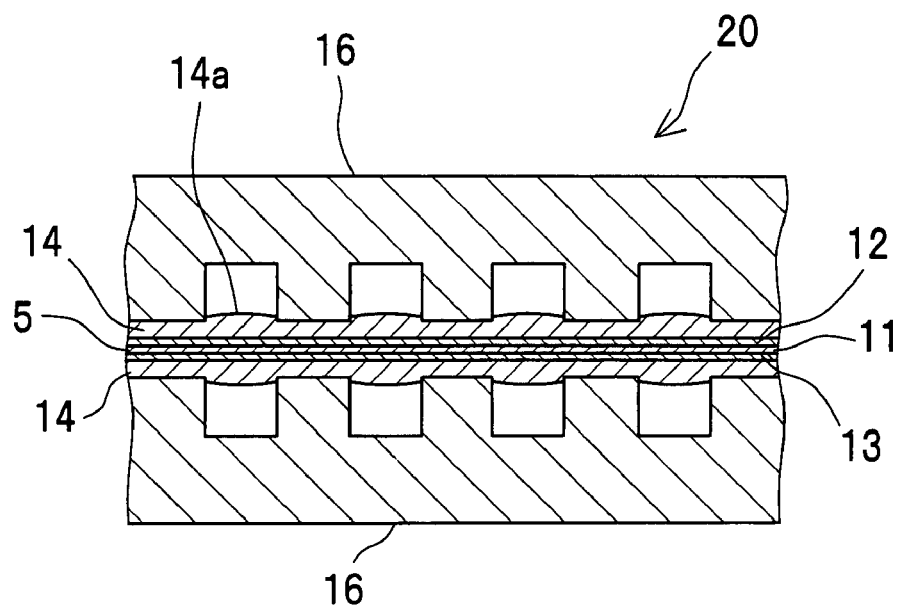
FIG. 5B is a schematic partial sectional view showing a cross section of the unit cell of FIG. 5A perpendicular to the primary direction of the gas flow passage.
Figure 6A:
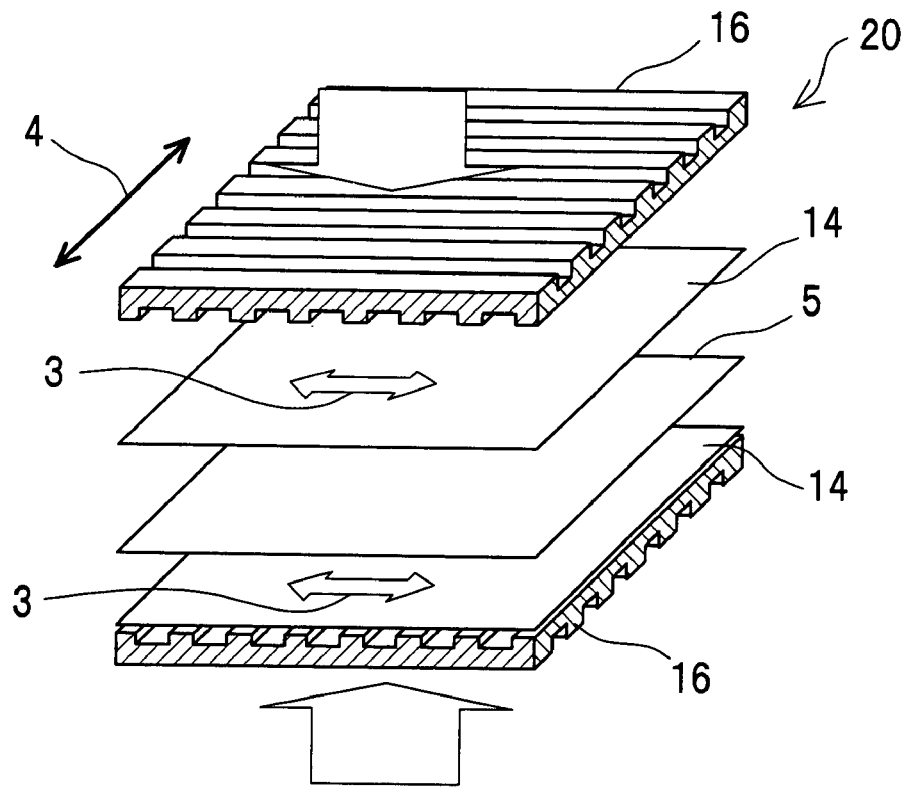
FIG. 6A is a schematic exploded view of a unit cell in which the warp direction of the carbon fiber woven cloth and the primary direction of the gas flow passage of the separator are set perpendicular to each other.
Figure 6B:
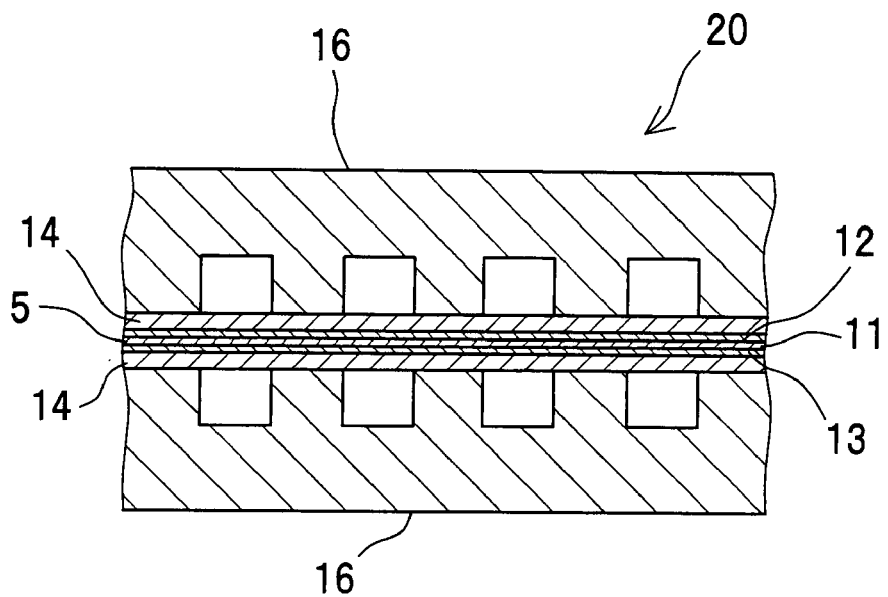
FIG. 6B is a schematic partial sectional view showing a cross section of the unit cell of FIG. 6A perpendicular to the primary direction of the gas flow passage.

A case is considered, as an example, where the carbon fiber woven cloth (gas-diffusion-layer base material 14) is anisotropic in that the elongation is smaller in the placement direction of the warp 21 than in the placement direction of the weft 22. In such a case, as shown in the schematic exploded view of FIG. 5A, with such a placement that a primary direction 4 of the gas flow passages 16a of the separator 16 is parallel to a placement direction 3 of the warp 21 of the carbon fiber woven cloth of the gas-diffusion-layer base material 14, it becomes more likely that the carbon fiber woven cloth sags into the gas flow passages 16a of the separator 16 during tightening operation as shown in the schematic sectional view of FIG. 5B. On the other hand, as shown in FIG. 6A, with a placement such that the primary direction 4 of the gas flow passages 16a of the separator 16 is perpendicular to the placement direction 3 of the warp 21 of the carbon fiber woven cloth of the gas-diffusion-layer base material 14, it becomes less likely that the carbon fiber woven cloth sags into the gas flow passages 16a of the separator 16 during tightening operation as shown in the schematic sectional view of FIG. 6B.

Figure 7:
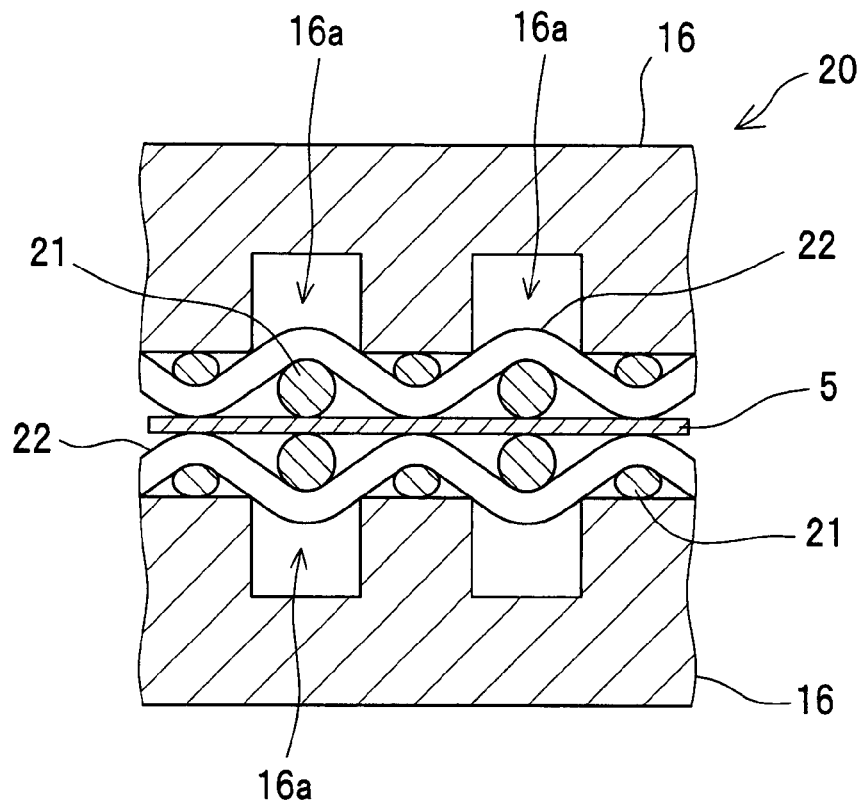
FIG. 7 is a schematic partial sectional view showing in more detail the cross section of the unit cell of FIG. 5B.

More specifically, in a case where the elongation of the carbon fiber woven cloth is smaller in the placement direction of the warp 21 and where the placement direction of the warp 21 and the primary direction of the gas flow passages 16a of the separator 16 are set parallel to each other as shown in the partial schematic sectional view of the unit cell 20 of FIG. 7, the weft 22 placed along the horizontal direction as in the figure are more likely to be elongated, making it less likely that the warp 21 are crushed by the weft 22, and the weft 22 are so placed as to be corrugated to more extent in the vertical direction. As a result, the carbon fiber woven cloth sags into the gas flow passages 16a of the separator 16 to a relatively larger extent.

Figure 8:
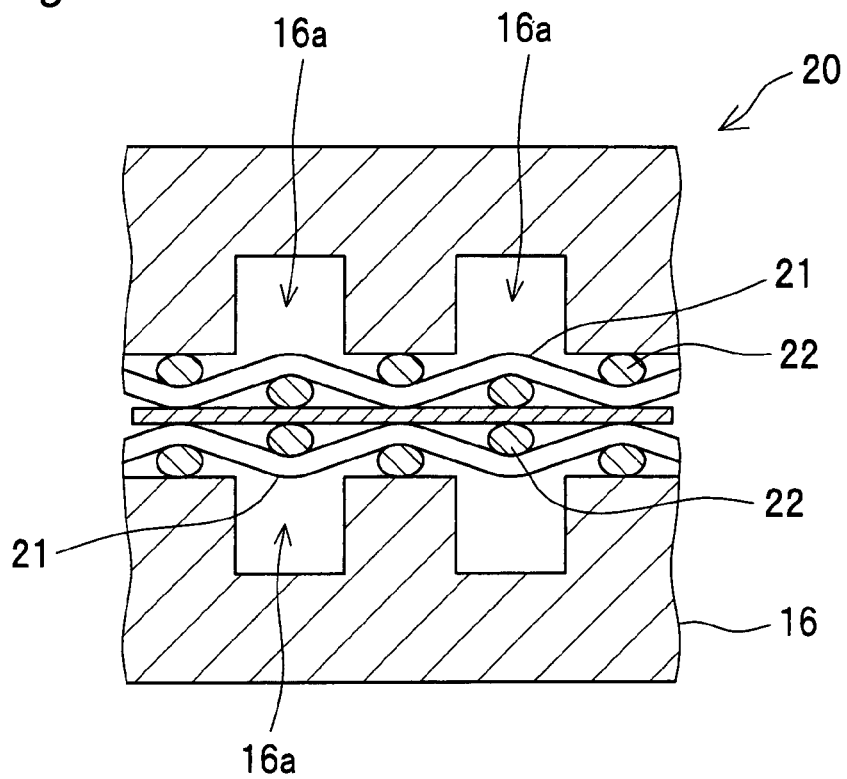
FIG. 8 is a schematic partial sectional view showing in more detail the cross section of the unit cell of FIG. 6B.

On the other hand, in a case where the placement direction of the warp 21 and the primary direction of the gas flow passages 16a of the separator 16 are perpendicular to each other as shown in the partial schematic sectional view of FIG. 8, the warp 21 placed along the horizontal direction as in the figure are less likely to be elongated, so that the weft 22 tend to be crushed by the warp 21, so that the warp 21 are less corrugated in the vertical direction. As a result, the carbon fiber woven cloth sags into the gas flow passages 16a of the separator 16 to a relatively smaller extent. In addition, in FIGS. 5A, 5B, 6A, 6B, 7 and 8, an assembly in which the catalytic layers 12, 13 are formed on both sides of the polyelectrolyte membrane 11, respectively, is represented as a polyelectrolyte membrane 5 with catalytic layers.

Table 1 shows results of measuring pressure loss in a unit cell relative to the elongation of the carbon fiber woven cloth in a direction perpendicular to the primary direction of the gas flow passages. In this case, the elongation of carbon fiber woven cloth was obtained by measuring a load versus displacement under the conditions of a test piece width 25 mm, a test piece thickness 0.4 mm, a chuck-to-chuck distance 100 mm and a feed rate 2 mm/min with a tension tester (SV-52 type, 1996 Model made by Imada Seisakusho, Tension and compression tester), and by determining a ratio of the displacement to an initial length with a load 10N. More specifically, with a test piece held vertically, a load was applied thereto by moving an upper chuck upward. Also, the chuck was subjected to a holding of the test piece via a rubber material. In this test, abnormal data due to damage of the rubber material or the like in the chuck are not picked up as test results. It is noted that the measurement of elongation of carbon fiber woven cloth shown above conforms to ASTM D1682-64, Standard test method for breaking load and elongation of textile woven fabrics, Section 17. The measurement of pressure loss in a unit cell was done under the conditions of a current density 0.25 A/cm$^2$, a fuel use factor 80%, an oxygen use factor 50%, a cell temperature 75° C., an anode dew point 75° C. and a cathode dew point 75° C.

TABLE 1

| Direction of carbon fiber woven cloth in tension test | Elongation of carbon fiber woven cloth (gas-diffusion-layer base material) in the direction perpendicular to the primary direction of gas flow passages | Pressure loss value in unit cell (kPa) | |
|---|---|---|---|
| | | Anode side | Cathode side |
| Warp | 2.1 | 8.9 | 8.3 |
| Warp | 3.1 | 9.5 | 8.7 |
| Warp | 4.2 | 9.9 | 8.9 |
| Weft | 5.3 | 10.2 | 9.1 |
| Weft | 6.2 | 10.6 | 9.3 |
| Weft | 6.9 | 11 | 9.5 |
| Weft | 7.8 | 11.9 | 9.7 |

As apparent from Table 1, the elongation of the carbon fiber woven cloth varies in each of the placement direction of the warp 21 and the placement direction of the weft 22 in the carbon fiber woven cloth. As the elongation of the carbon fiber woven cloth in the direction perpendicular to the primary direction of the gas flow passages 16a becomes larger, the pressure loss value in the unit cell increases, as it was shown in the test results. Such a tendency was common to both anode and cathode sides, and appeared noticeably particularly on the anode side. As for the reason of this, in a fuel cell, since oxidizer gas is larger in necessary flow rate than fuel gas, the cathode side flow passages are larger in number than the anode side flow passages. Therefore, the total flow passage cross-sectional area on the anode side is smaller than that on the cathode side, so that the anode side is more affected by sagging variations of the gas-diffusion-layer base material into the gas flow passages.

Figure 9:
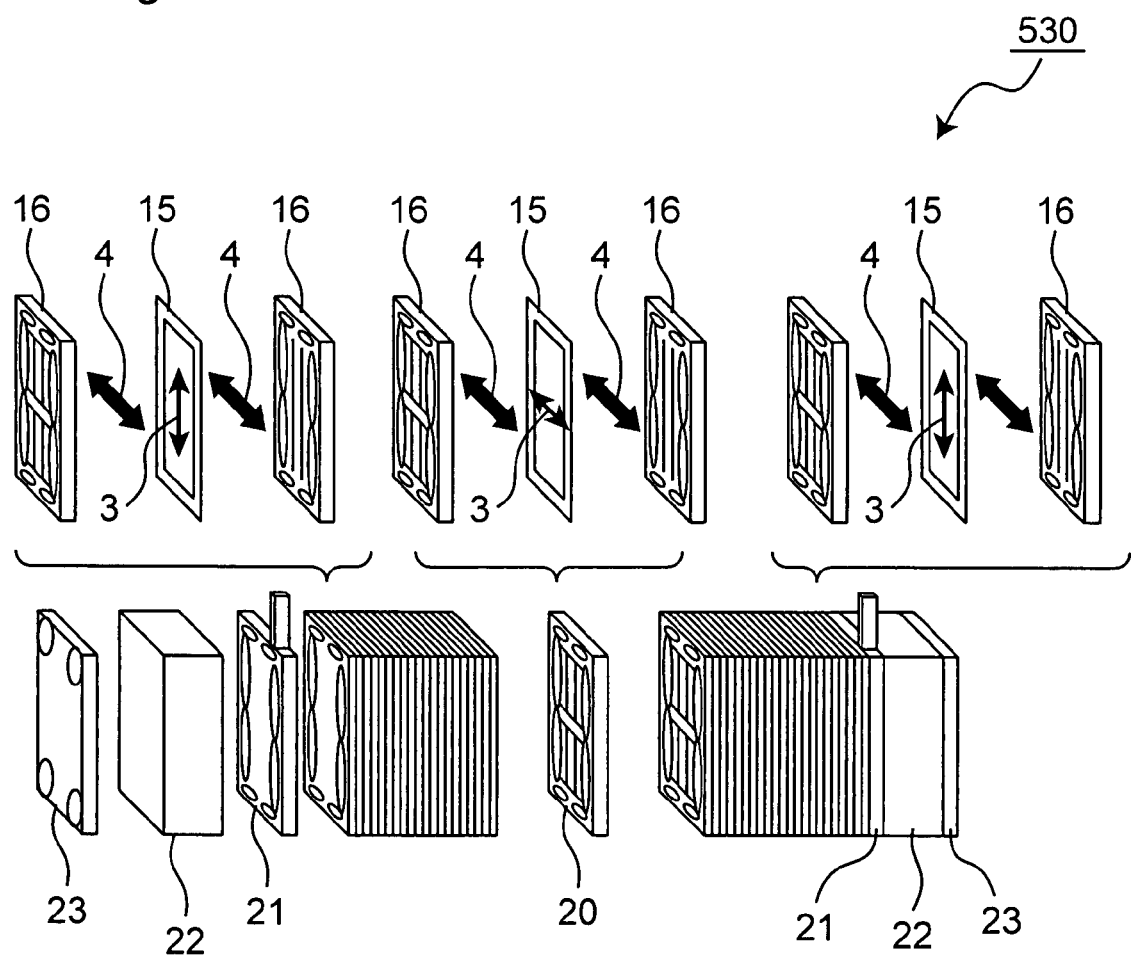
FIG. 9 is a schematic exploded view of a fuel-cell stack according to a comparative example against the foregoing embodiment of the invention.

Thus, as in a stack 530 included in a fuel cell which is a comparative example of the present invention shown in the schematic exploded view of FIG. 9, with a placement that a placement direction 3 of warp in the carbon fiber woven cloth (gas-diffusion-layer base material 14) and a primary direction 4 of the gas flow passages of the separators 16 are set at random (irregularly) among the cells 20, elongation variations among the cells 20 of the carbon fiber woven cloth in the direction perpendicular to the primary direction 4 of the gas flow passages become larger, so that variations in the pressure loss of the gas flow passages among the cells 20 result in larger ones. As a result, in such a fuel cell 530, there arises an issue that the anti-flooding property becomes worse in cells of higher pressure loss.

In contrast to this, the stack 30 included in the fuel cell 101 of this embodiment, as shown in FIG. 2, is designed to reduce elongation variations among the cells of the gas-diffusion-layer base material in the direction perpendicular to the primary direction 3 of the gas flow passages of the separators 16 by setting a placement relation that the placement direction 3 of the warp of the carbon fiber woven cloth (gas-diffusion-layer base material 14) and the primary direction 4 of the gas flow passages of the separators 16 are identical among all the cells 20, for example, by setting a placement that the placement direction 3 of the warp and the primary direction 4 of the gas flow passages are perpendicular to each other. Such elongation variations among the cells, as will be described later, are preferably limited to within ±30% and more preferably, within ±20%. It is noted that the placement in the stack 30 as shown above is not limited only to such a placement that the placement direction 3 of the warp and the primary direction 4 of the gas flow passages are perpendicular to each other as described above, and it is the only requirement that the placement relation between the placement direction 3 of the warp and the primary direction 4 of the gas flow passages be the same among all the cells 20. Such elongation variations among the cells as described above can be reduced even in a case where the placement direction 3 of the warp and the primary direction 4 of the gas flow passages are set parallel to each other in all the cells 20, for example, as in a stack 130 shown in the schematic exploded view of FIG. 10.

Figure 11:
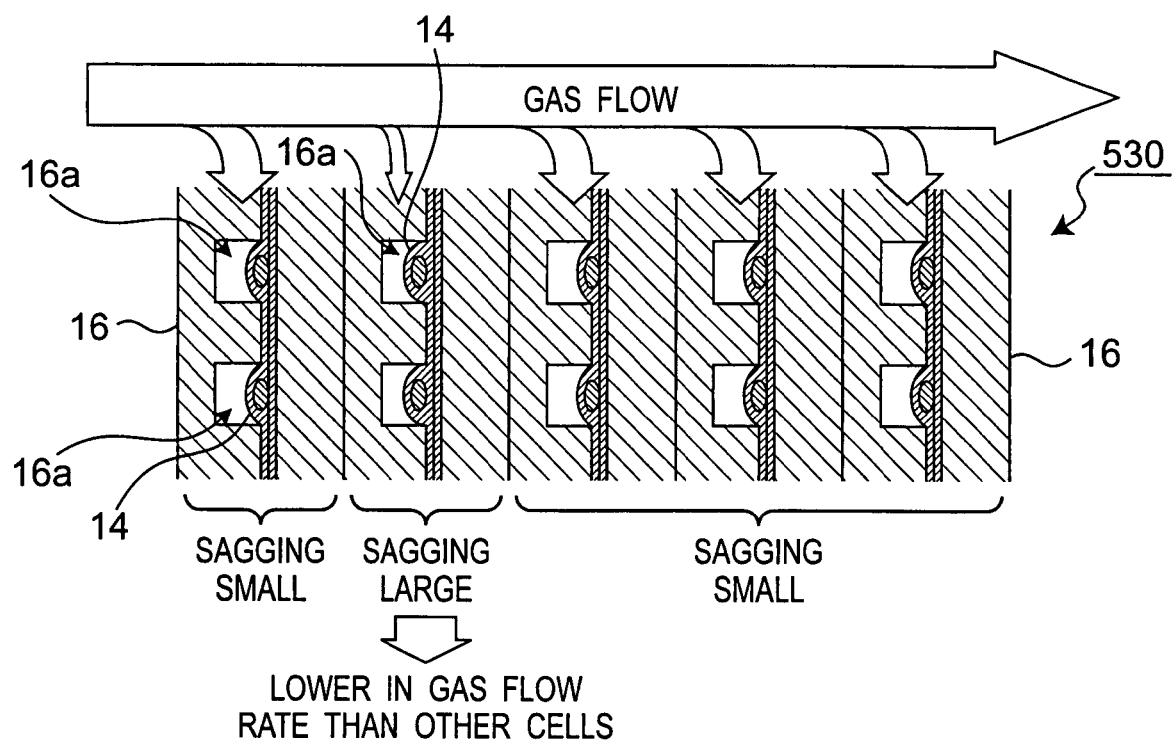
FIG. 11 is a conceptual view of a gas flow in the stack of the comparative example of FIG. 9.

More specifically, in the placement of the stack 530 of the comparative example shown in FIG. 9, there is a composite presence of cells 20 which are larger in the sagging amount of the gas-diffusion-layer base material 14 into the gas flow passages and cells 20 which are smaller in the amount because of occurrence of relatively larger elongation variations among the cells 20 of the gas-diffusion-layer base material 14 in the direction perpendicular to the primary direction of the gas flow passages of the separators as shown in the conceptual view of the fuel gas flow in the stack 530 of FIG. 11. Therefore, pressure loss variations of the gas flow passages among the cells 20 become larger, making the flooding relatively likely to occur.

Figure 12:
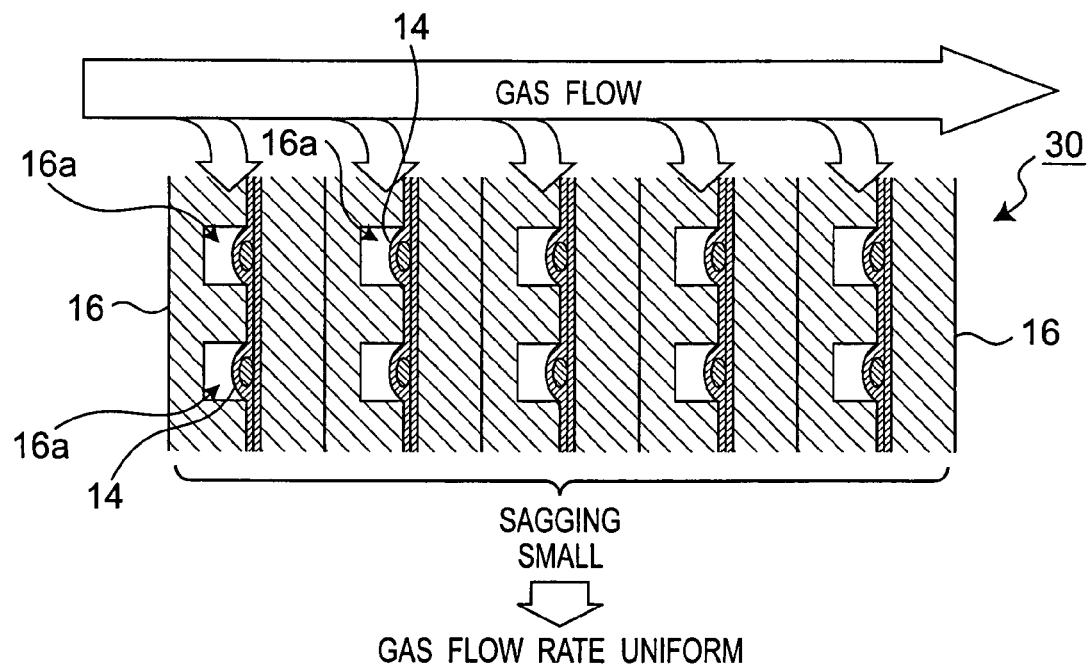
FIG. 12 is a conceptual view of a gas flow in the stack of the embodiment of FIG. 2.

Meanwhile, in the placement of the stack 30 of this embodiment shown in FIG. 2, variations among the cells 20 in the sagging amount of the gas-diffusion-layer base material 14 into the gas flow passages can be suppressed to relatively small ones by a setting that elongation variations among the cells 20 of the gas-diffusion-layer base material 14 in the direction perpendicular to the primary direction of the gas flow passages of the separators are suppressed to relatively smaller ones as shown in the conceptual view of the fuel gas flow in the stack 30 of FIG. 12. Thus, pressure loss variation of the gas flow passages can be reduced among the cells 20, so that the anti-flooding property can be improved. Also, since the sagging amount itself of the gas-diffusion-layer base material 14 into the gas flow passages can be reduced, the pressure loss itself of the gas flow passages can be reduced, making it possible to achieve a successful gas flow.

Figure 10:
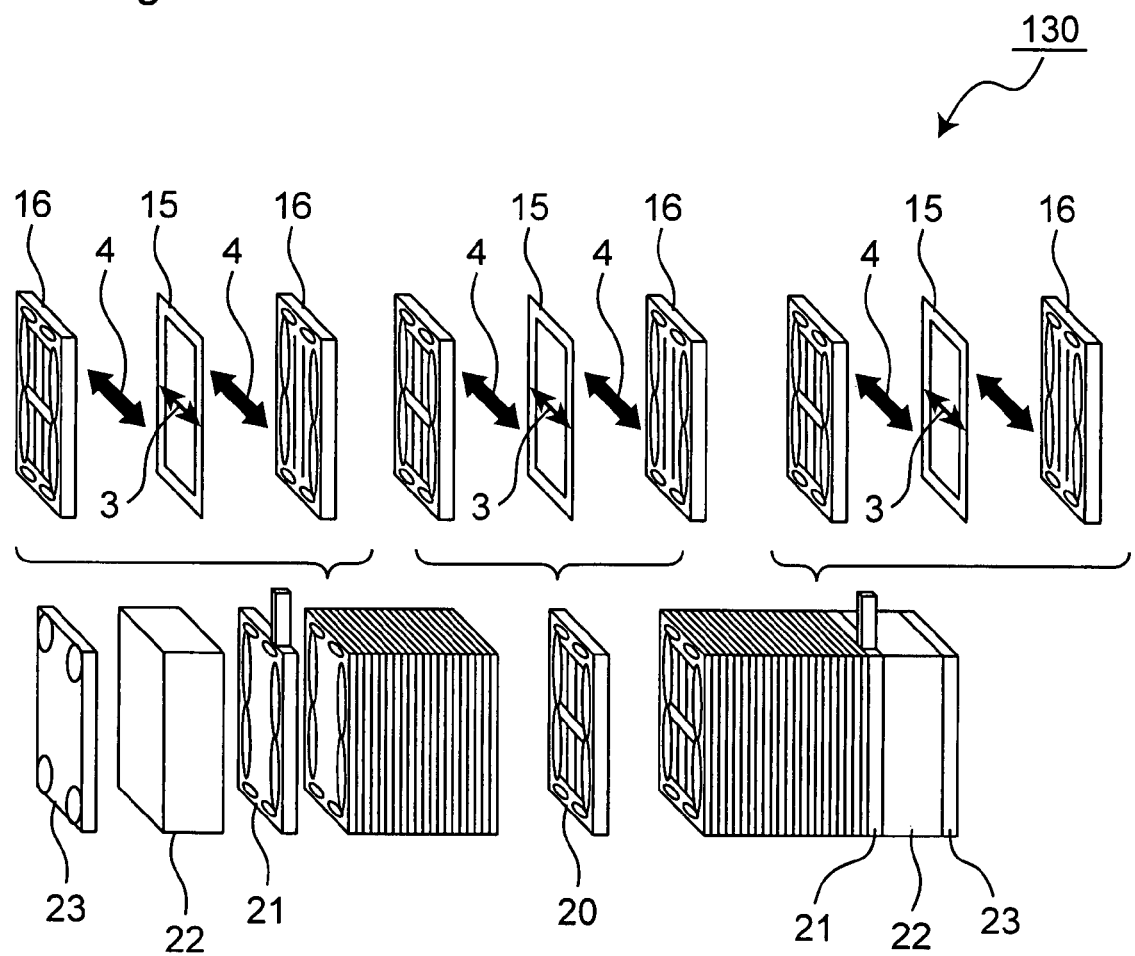
FIG. 10 is a schematic exploded view of a fuel-cell stack according to a modification of the foregoing embodiment.
Figure 13:
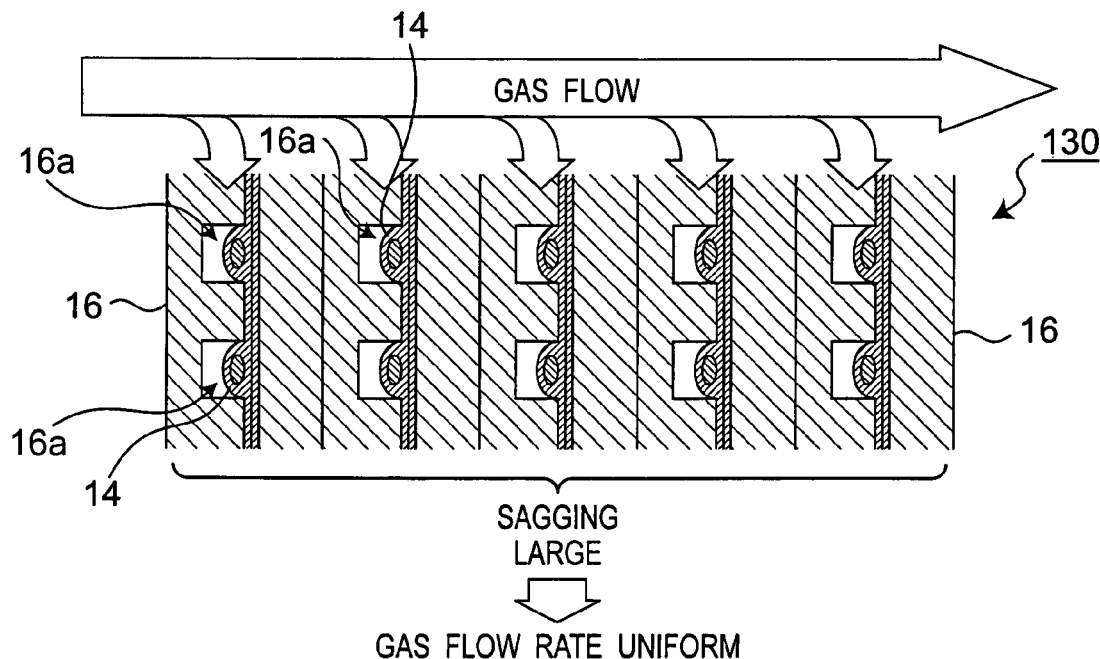
FIG. 13 is a conceptual view of a gas flow in the stack of the modification of the embodiment of FIG. 10.

Even with the placement of another stack 130 of this embodiment shown in FIG. 10, since elongation variations among the cells 20 are suppressed relatively small as shown in the conceptual view of the fuel gas flow of FIG. 13, the sagging amount itself of the gas-diffusion-layer base material 14 into the gas flow passages, although larger than that of the stack 30, can be suppressed smaller among the cells, so that the anti-flooding property can be improved.

Furthermore, there could be some cases where, even with a placement that the primary direction of the gas flow passages of the separators 16 is perpendicular to the placement direction of warp of the carbon fiber woven cloth of the gas-diffusion-layer base material 14, the elongation in the placement direction of the warp may becomes larger, for example, due to a condition that tension of the warp lowers during the weaving of the carbon fiber woven cloth. In such a case, with the above-described placement, the sagging amount of the gas-diffusion-layer base material 14 into the gas flow passages during the tightening operation could become larger. Accordingly, in such a case, it is preferred to adopt a placement that the placement direction of the warp and the primary direction of the gas flow passages are set parallel to each other.

The above description has been given on a case where the gas-diffusion-layer base material 14 is formed from carbon fiber woven cloth. However, this embodiment is not limited only to such a case, and the above-described effects of this embodiment can also be obtained even in cases where, for example, the gas-diffusion-layer base material 14 is formed from carbon fiber nonwoven cloth.

Figure 14:
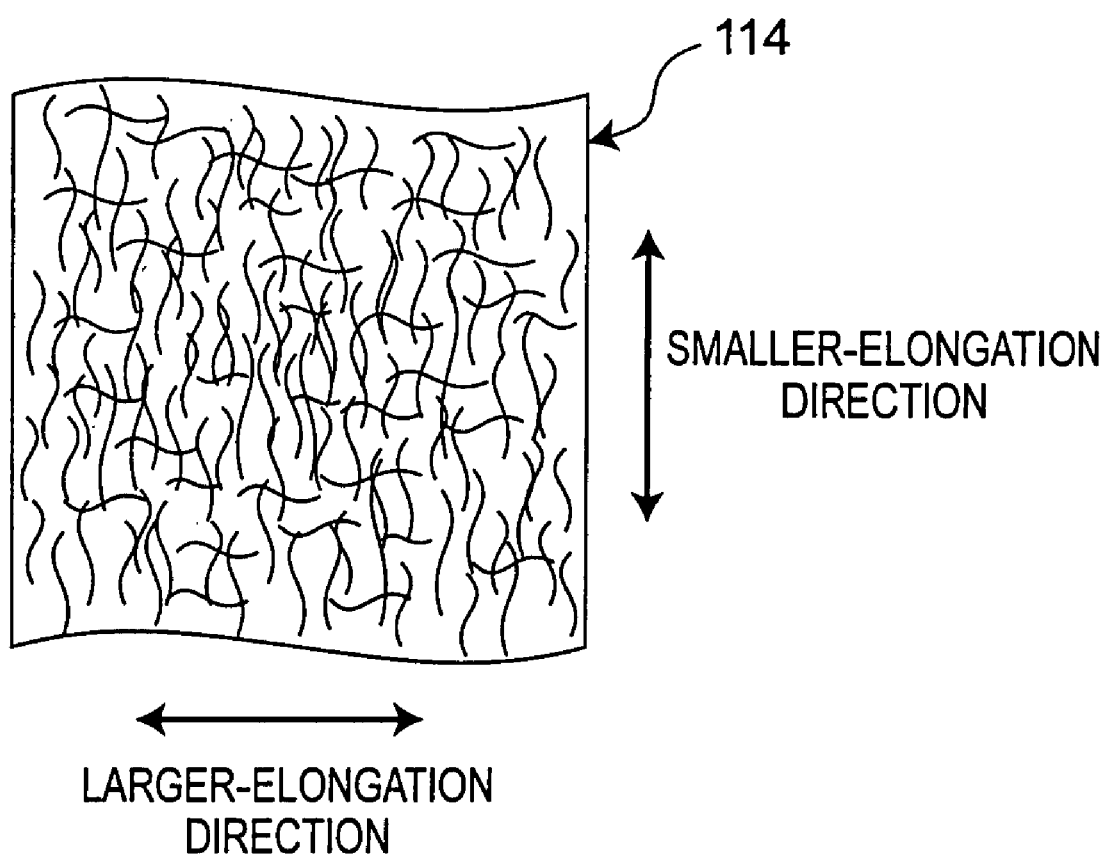
FIG. 14 is a schematic plan view of a gas-diffusion-layer base material formed from carbon fiber nonwoven cloth.

More specifically, in a case where a gas-diffusion-layer base material 114 is formed from carbon fiber nonwoven cloth which has one direction of smaller elongations and another direction of larger elongations, the two directions being perpendicular to each other, as shown in the schematic plan view of the gas-diffusion-layer base material 114 of FIG. 14, effects similar to those of the above-described carbon fiber woven cloth can be obtained by adopting a placement that the direction of smaller elongations is set, or the direction of larger elongations is set, perpendicular to the primary direction of the gas flow passages of the separators in all the cells of the stack.

Figure 15:
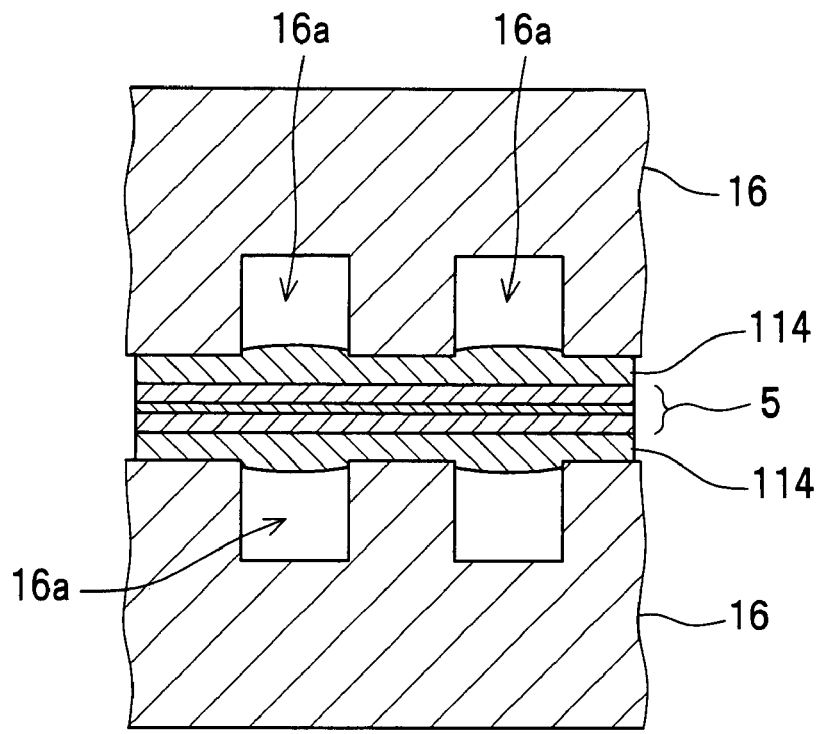
FIG. 15 is a schematic partial sectional view of a cell in which a smaller-elongation direction of the carbon fiber non-woven cloth of FIG. 14 is set perpendicular to the primary direction of the gas flow passage.
Figure 16:
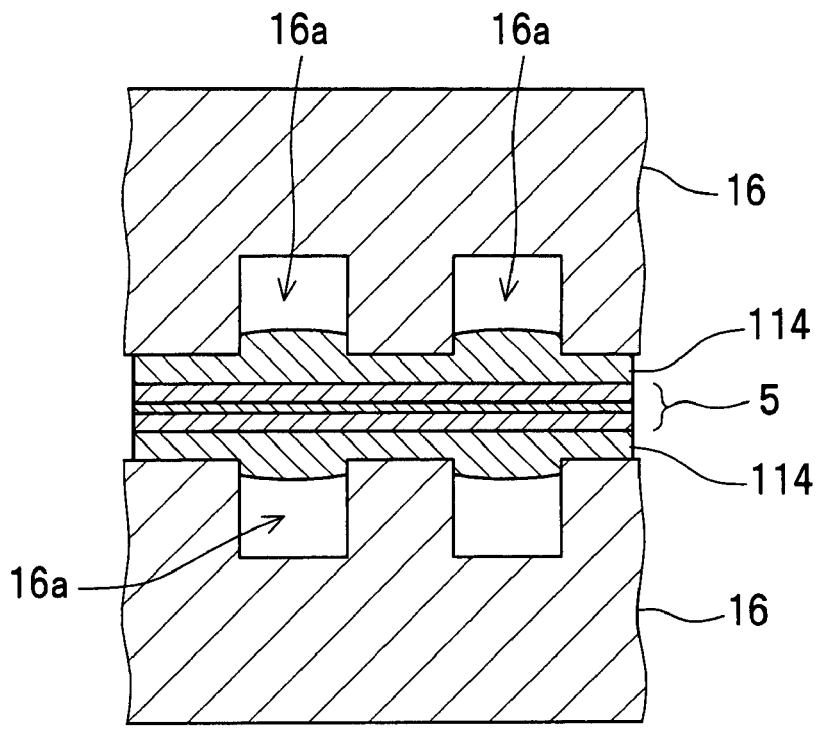
FIG. 16 is a schematic partial sectional view of a cell in which a larger-elongation direction of the carbon fiber non-woven cloth of FIG. 14 is set perpendicular to the primary direction of the gas flow passage.

In the case where carbon fiber nonwoven cloth is used as the gas-diffusion-layer base material 114 as shown above and where, for example, the direction of smaller elongations is set perpendicular to the primary direction of the gas flow passages as shown in the schematic sectional view of FIG. 15, the sagging amount of the gas-diffusion-layer base material 114 into the gas flow passages 16a of the separator 16 becomes relatively small. Further, in the case where, for example, the direction of larger elongations is set perpendicular to the primary direction of the gas flow passages as shown in the schematic sectional view of FIG. 16, the sagging amount of the gas-diffusion-layer base material 114 into the gas flow passages of the separator 16 becomes relatively large. Thus, pressure loss variations of the gas flow passages among the cells can be reduced by a setting that the placement direction of the gas-diffusion-layer base material 114 formed from carbon fiber nonwoven cloth, which is characterized in that the sagging amount into the gas flow passages 16a varies depending on the placement direction, is set uniform among all the cells.

Figure 17:
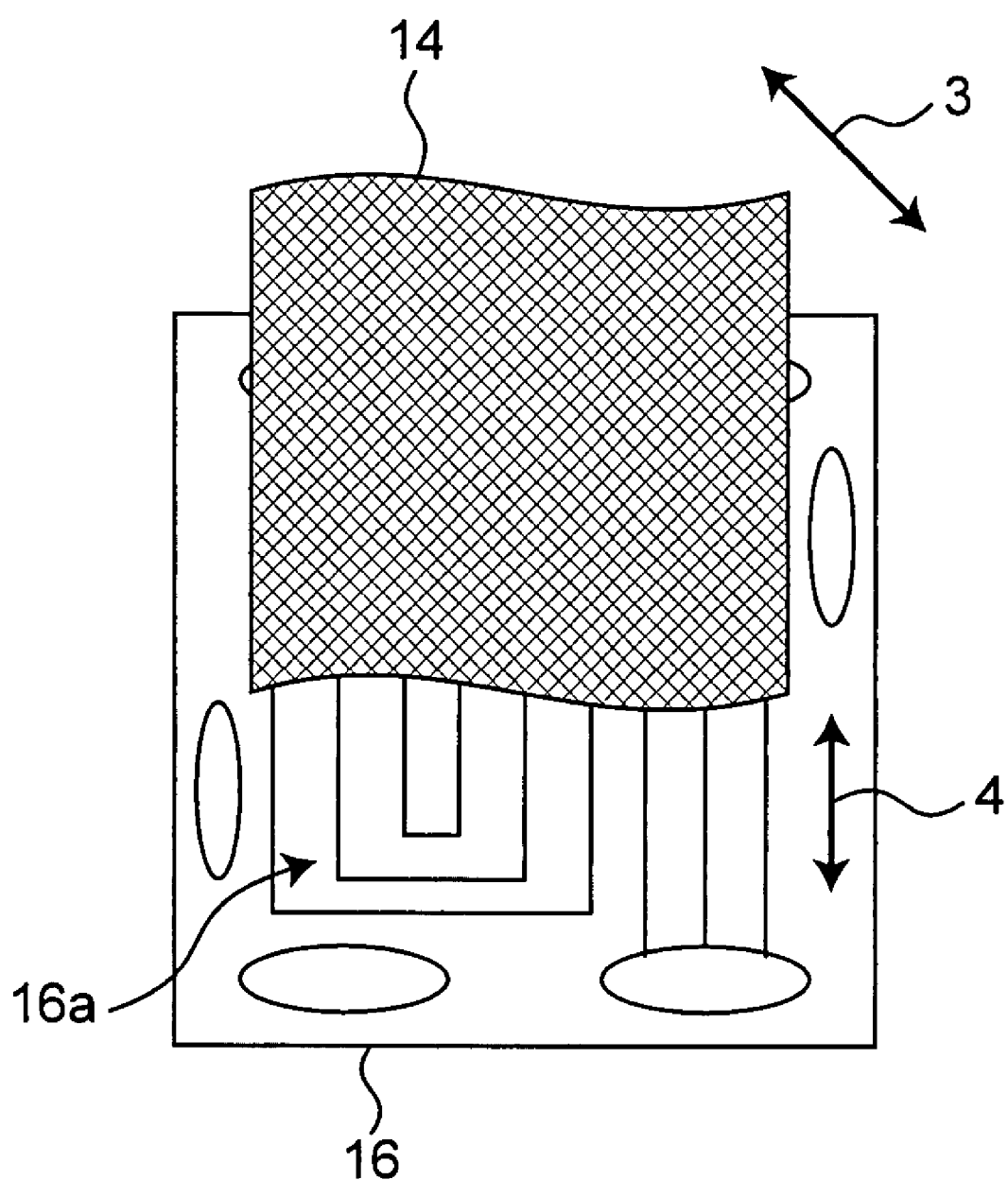
FIG. 17 is a schematic plan view showing a state that a warp direction of carbon fiber woven cloth diagonally intersects the primary direction of the gas flow passage.

Furthermore, the foregoing embodiment has been described in a case where the placement direction of the gas-diffusion-layer base material 14 formed from carbon fiber woven cloth is so set that the placement direction of the warp 21 is perpendicular to, or parallel to, the primary direction of the gas flow passages 16a of the separators 16. However, this embodiment is not limited only to such a case, and the case may be, for example, that the placement direction 3 of the warp 21 is so set as to diagonally intersect the primary direction 4 of the gas flow passages (e.g., a placement along a 45° direction) as shown in the schematic plan view of FIG. 17. In such a case also, the elongation variations can be reduced by an adoption of a uniform placement among all the cells of the stack, so that the pressure loss variations can be reduced. Accordingly, only if a uniform placement is adopted for all the cells, the placement relation between the primary direction 4 of the gas flow passages and the placement direction 3 of the warp 21 does not matter from the viewpoint of improvement of the anti-flooding property.

Hereinbelow, the present invention will be described in further detail based on examples thereof, but the invention is not limited by those examples.

Example 1

First, a method for fabricating an MEA included in a fuel-cell stack according to Example 1 of the invention is explained. Both sides of a polyelectrolyte membrane (Nafion 112 made by DuPont) were coated with a catalyst in which platinum was carried on acetylene black powder, by which a catalytic layer was formed. Further on outer surfaces of the catalytic layer, a gas diffusion layer formed with a base material of carbon fiber woven cloth was placed. The carbon fiber woven cloth was of plain weave, and GDL-1 (gas-diffusion-layer base material-1) shown in Table 2 was used therefor.

Figure 20:
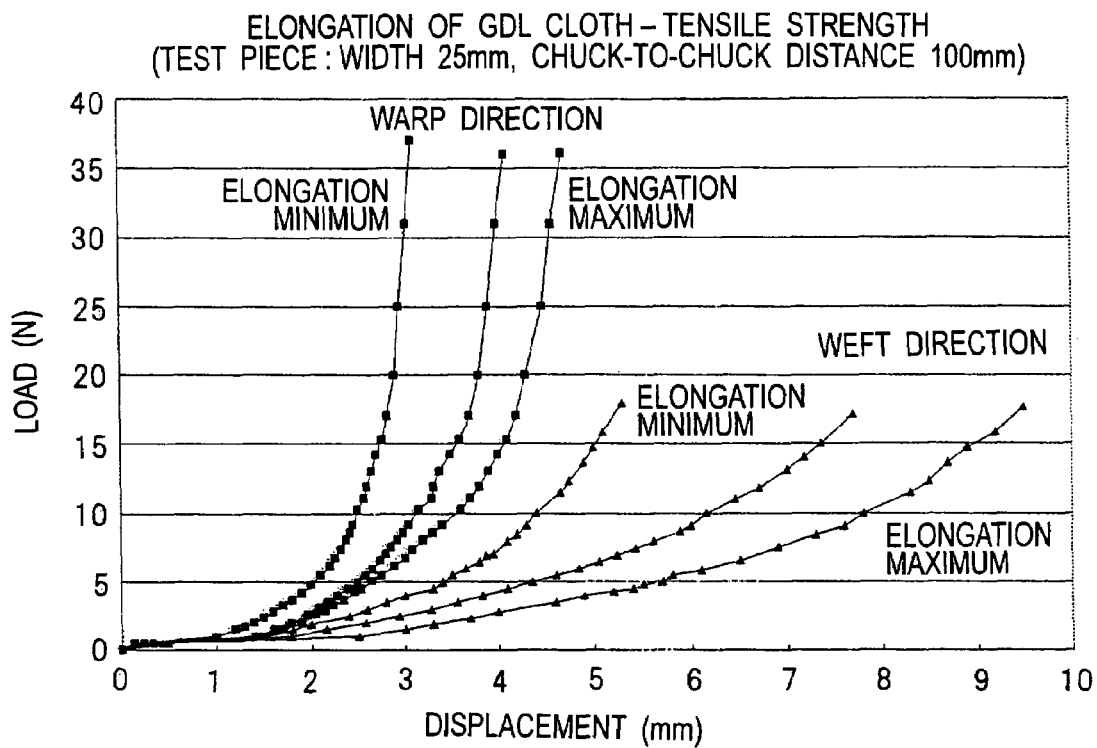
FIG. 20 is a graph showing elongation characteristics of a gas-diffusion-layer base material GDL-1.
Figure 21:
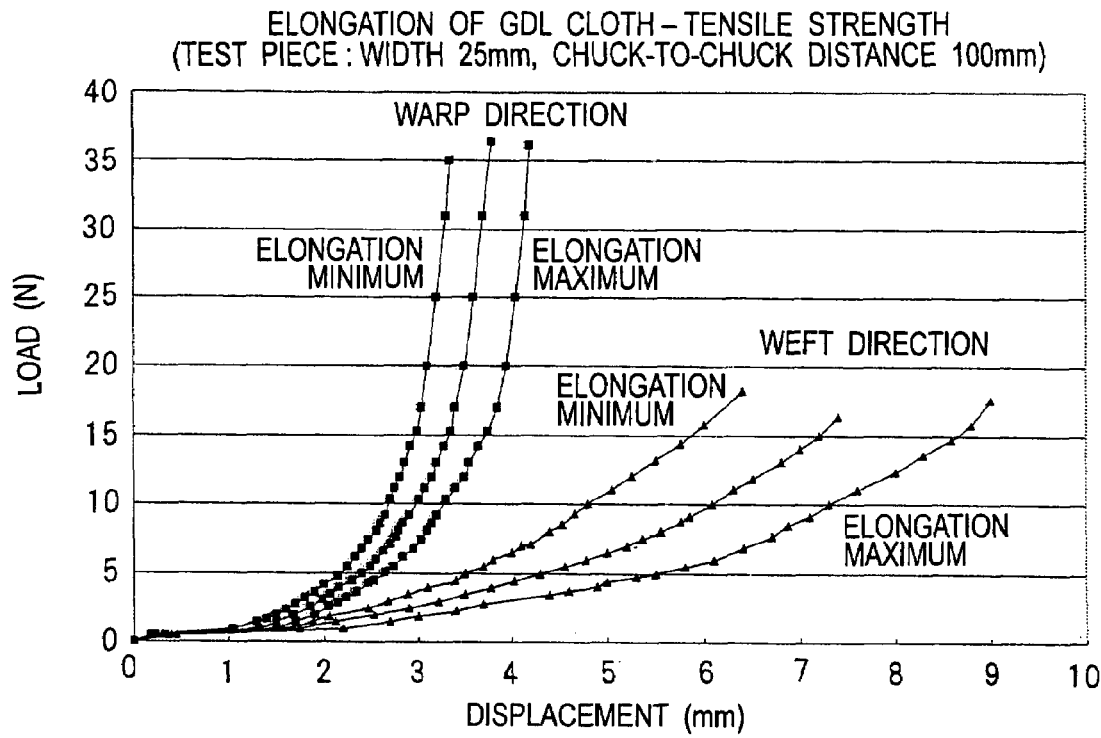
FIG. 21 is a graph showing elongation characteristics of a gas-diffusion-layer base material GDL-2.

It is noted that Table 2 shows characteristic data on elongations of two kinds of gas-diffusion-layer base materials, GDL-1 and GDL-2, of different characteristics. An elongation (%) is expressed in value from a calculation that a displacement amount of carbon fiber woven cloth at a load 10N resulting from application of a tensile load to a 25 mm wide carbon fiber woven cloth with a chuck-to-chuck distance 100 mm was divided by an initial length of the cloth (i.e. an initial chuck-to-chuck distance). In Table 2, the term "mean", refers to a mean value of elongations among plural sheets of carbon fiber woven cloth of one same kind. Also, an elongation variation among plural sheets of such carbon fiber woven cloth of the same kind as shown above is expressed by a ratio of a variance of an elongation maximum value or an elongation minimum value to the elongation mean value (i.e. (elongation maximum value−elongation minimum value)/(elongation mean value), or (elongation minimum value−elongation mean value)/(elongation mean value)). For example, elongation variations are within ±28% in the placement direction of weft and within ±18% in the placement direction of warp in the case of GDL-1, while elongation variations are within ±20% in the placement direction of weft and within ±10% in the placement direction of warp in the case of GDL-2, proving that GDL-2 is a base material having a characteristic of smaller elongation variations than GDL-1. Graphs showing mean, maximum and minimum value data of elongations in GDL-1 and GDL-2 shown above in the placement directions of warp and weft are given in FIGS. 20 and 21, respectively. In the graphs shown in FIGS. 20 and 21, the vertical axis represents load (N) and the horizontal axis represents displacement (mm).

Among other means for expressing such elongation variations as shown above are, for example, the absolute difference between elongation maximum value and elongation minimum value (%), and the S/N ratio (=10·log{(elongation mean)$^2$·(elongation standard deviation)$^2$}:dB). In addition, the column "Warp and weft at random" in the placement directions shown in Table 2 represents elongation data resulting in the case where the placement direction of weft and the placement direction of warp were mixed at a ratio of 1:1.

Next, a method for fabricating the separator is explained. Artificial graphite powder 80 wt % having a mean particle size of about 50 μm was kneaded with 20 wt % of thermosetting phenol resin by an extrusion kneader. The resulting kneaded powder was thrown into a mold, which had been machined for molding of gas-flow-passage grooves and cooling-water-passage grooves as well as manifolds, and then hot pressed. The hot pressing was done under the conditions of a mold temperature 180° C., a pressure 100 kgf/cm² and a duration time 5 min. An obtained separator was 20 cm×20 cm in its outer size, 3.0 mm in thickness and 1.0 mm in gas-flow-passage and cooling-water-passage depth.

Next, a separator with oxidizer-gas flow passages formed therein and a separator with fuel-gas flow passages formed therein were laid one on top of another with the MEA interposed therebetween so that their gas flow passages would be set in place, by which a unit cell was made up. In this case, the MEA was so placed that the placement direction of warp of the carbon fiber woven cloth in the gas diffusion layer would be parallel to the primary direction of the gas flow passages of the separators on both anode and cathode sides in every unit cell. That is, the gas-diffusion-layer base material (GDL-1) was so placed that, as shown in Table 2, elongation variations with respect to the direction perpendicular to the primary direction of the gas flow passages would fall within ±28%. This unit cell was stacked one on another to a quantity of 50 cells in series, and a stainless current-collector plate, an insulating plate made of an electrical insulating material and an end plate were placed on each of the two end portions, all of these members being fixed by a tightening rod, by which a fuel-cell stack was fabricated (assembled). The tightening pressure in this case was set to 15 kgf/cm² for the separator area.

A polymer electrolyte fuel cell including the stack of this Example 1 fabricated in this way was held at 75° C., and hydrogen gas (fuel gas) humidified and heated to a dew point of 75° C. was fed to one electrode side while air (oxidizer gas) humidified and heated to a dew point of 75° C. was fed to another electrode side.

Under the conditions of an oxygen use factor 50% and a current density 0.25 A/cm², the fuel cell was operated with the fuel use factor incremented in steps of 5% from 50%. In this case, during a 5-hour operation, when the operation was done with all the cell voltages stable, the fuel use factor was incremented by 5%. Then, during the 5-hour operation, when the cell voltage became lower than 600 mV, the test was ceased, where the highest fuel use factor at which the operation was able to be done with all the cell voltages stable was taken as a limit fuel use factor (limit Uf).

Next, under the conditions of a fuel use factor 70% and a current density 0.25 A/cm², the fuel cell was operated with the oxygen use factor incremented in steps of 2.5% from 30%. In this case, during a 5-hour operation, when the operation was done with all the cell voltages stable, the oxygen use factor was incremented by 5%. Then, during the 5-hour operation, when the cell voltage became lower than 600 mV, the test was ceased, where the highest oxygen use factor at which the operation was able to be done with all the cell voltages stable was taken as a limit oxygen use factor (limit Uo).

From the above results, it can be said that the larger the limit fuel use factor (limit Uf) and the limit oxygen use factor (limit Uo) are, the more successful the anti-flooding property of the polymer electrolyte fuel cell is. These limit fuel use factor (limit Uf) and the limit oxygen use factor (limit Uo) are shown in Table 3.

The mean pressure loss and the standard deviation in unit cells in Table 3 were determined by measuring all pressure losses in the unit-cell state before stacking and by determining the mean value and the standard deviation from those results. The conditions in the unit cell were a current density 0.25 A/cm², a fuel use factor 70%, an oxygen use factor 50%, a cell temperature 75° C., an anode dew point 75° C. and a cathode dew point 75° C. Also, the pressure loss of the fuel cell was obtained in value under the conditions of a current density 0.25 A/cm², a fuel use factor 70%, an oxygen use factor 50%, a cell temperature 75° C., an anode dew point 75° C. and a cathode dew point 75° C.

Example 2

Next, a fuel-cell stack according to Example 2 is described. An MEA and a separator were fabricated in the same manner as in Example 1, and a unit cell was fabricated in such a placement that the placement direction of warp of the carbon fiber woven cloth GDL-1 shown in Table 2 would be perpendicular to the primary direction of the gas flow passages of the separator. As in Example 1, this unit cell was stacked to a quantity of 50 cells, and a stainless current-collector plate, an insulating plate made of an electrical insulating material and an end plate were placed on each of the two end portions, all of these members being fixed by a tightening rod, by which a fuel-cell stack was fabricated. That is, in Example 2, a stack in which the gas-diffusion-layer base material (GDL-1) was so placed that elongation variations with respect to the direction perpendicular to the primary direction of the gas flow passages would fall within ±18% as shown in Table 2 was fabricated.

A polymer electrolyte fuel cell including the fuel-cell stack of this Example 2 fabricated in this way was subjected to measurement of anti-flooding property, mean pressure loss and standard deviation in unit cells and pressure loss of the fuel cell under the conditions of Example 1. The results are shown in Table 3.

Example 3

Next, a fuel-cell stack according to Example 3 is described. An MEA and a separator were fabricated in the same manner as in Example 1, and a unit cell was fabricated in such a placement that the placement direction of warp of the carbon fiber woven cloth GDL-2 shown in Table 2 would be parallel to the primary direction of the gas flow passages of the separator.

As in Example 1, this unit cell was stacked to a quantity of 50 cells, and a stainless current-collector plate, an insulating plate made of an electrical insulating material and an end plate were placed on each of the two end portions, all of these members being fixed by a tightening rod, by which a fuel-cell stack was fabricated. That is, in Example 2, a stack in which the gas-diffusion-layer base material (GDL-2) was so placed that elongation variations with respect to the direction perpendicular to the primary direction of the gas flow passages would fall within ±20% as shown in Table 2 was fabricated.

A polymer electrolyte fuel cell including the fuel-cell stack of this Example 3 fabricated in this way was subjected to measurement of anti-flooding property, mean pressure loss and standard deviation in unit cells and pressure loss of the fuel cell under the conditions of Example 1. The results are shown in Table 3.

Example 4

Next, a fuel-cell stack according to Example 4 is described. An MEA and a separator were fabricated in the same manner as in Example 1, and a unit cell was fabricated in such a placement that the placement direction of warp of the carbon fiber woven cloth GDL-2 shown in Table 2 would be perpendicular to the primary direction of the gas flow passages of the separator.

As in Example 1, this unit cell was stacked to a quantity of 50 cells, and a stainless current-collector plate, an insulating plate made of an electrical insulating material and an end plate were placed on each of the two end portions, all of these members being fixed by a tightening rod, by which a fuel-cell stack was fabricated. That is, in Example 4, a stack in which the gas-diffusion-layer base material (GDL-2) was so placed that elongation variations with respect to the direction perpendicular to the primary direction of the gas flow passages would fall within ±10% as shown in Table 2 was fabricated.

Figure 18:
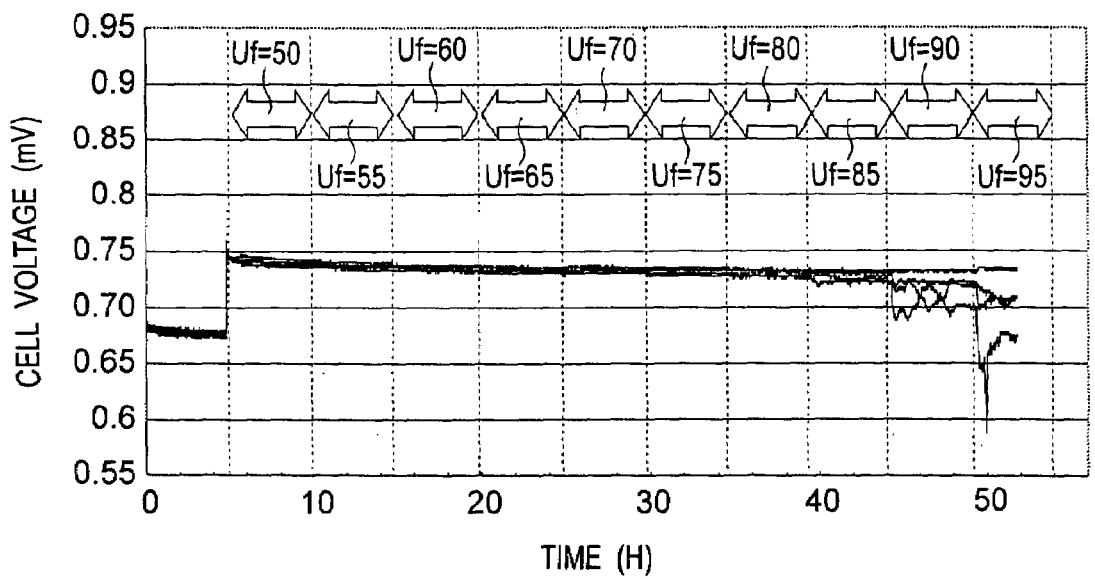
FIG. 18 is a graph showing fuel efficiency characteristics of the fuel cell according to Example 4 of the invention.

A polymer electrolyte fuel cell including the fuel-cell stack of this Example 4 fabricated in this way was subjected to measurement of anti-flooding property, mean pressure loss and standard deviation in unit cells and pressure loss of the fuel cell under the conditions of Example 1. The results are shown in Table 3. Further, data as to measurement results of Uf characteristics in the fuel cell of this Example 4 are shown in FIG. 18. In addition, in the graph of FIG. 18, the vertical axis represents cell voltage and the horizontal axis represents time.

Comparative Example 1

Next, a fuel-cell stack according to Comparative Example 1 against Examples 1 to 4 is described. An MEA and a separator were fabricated in the same manner as in Example 1, and a unit cell was fabricated to a total quantity of 50 cells in such a placement that the placement direction of warp of the carbon fiber woven cloth GDL-1 shown in Table 2 would be parallel in 25 cells and perpendicular in the other 25 cells to the primary direction of the gas flow passages of the separator. This unit cell was stacked to a quantity of 50 cells at random and, as in Example 1, a stainless current-collector plate, an insulating plate made of an electrical insulating material and an end plate were placed on each of the two end portions, all of these members being fixed by a tightening rod, by which a fuel-cell stack was fabricated. That is, in Comparative Example 1, a stack in which the gas-diffusion-layer base material (GDL-1 in a mixed placement with a weft direction to warp direction ratio of 1:1) was so placed that elongation variations with respect to the direction perpendicular to the primary direction of the gas flow passages would fall within ±48% was fabricated.

A polymer electrolyte fuel cell including the fuel-cell stack of Comparative Example 1 fabricated in this way was subjected to measurement of anti-flooding property, mean pressure loss and standard deviation in unit cells and pressure loss of the fuel cell under the conditions of Example 1. The results are shown in Table 3.

Comparative Example 2

Next, a fuel-cell stack according to Comparative Example 2 is described. An MEA and a separator were fabricated in the same manner as in Example 1, and a unit cell was fabricated to a total quantity of 50 cells in such a placement that the placement direction of warp of the carbon fiber woven cloth GDL-2 shown in Table 2 would be parallel in 25 cells and perpendicular in the other 25 cells to the primary direction of the gas flow passages of the separator. This unit cell was stacked to a quantity of 50 cells at random and, as in Example 1, a stainless current-collector plate, an insulating plate made of an electrical insulating material and an end plate were placed on each of the two end portions, all of these members being fixed by a tightening rod, by which a fuel-cell stack was fabricated. That is, in Comparative Example 2, a stack in which the gas-diffusion-layer base material (GDL-2 in a mixed placement with a weft direction to warp direction ratio of 1:1) was so placed that elongation variations with respect to the direction perpendicular to the primary direction of the gas flow passages would fall within ±41% was fabricated.

Figure 19:
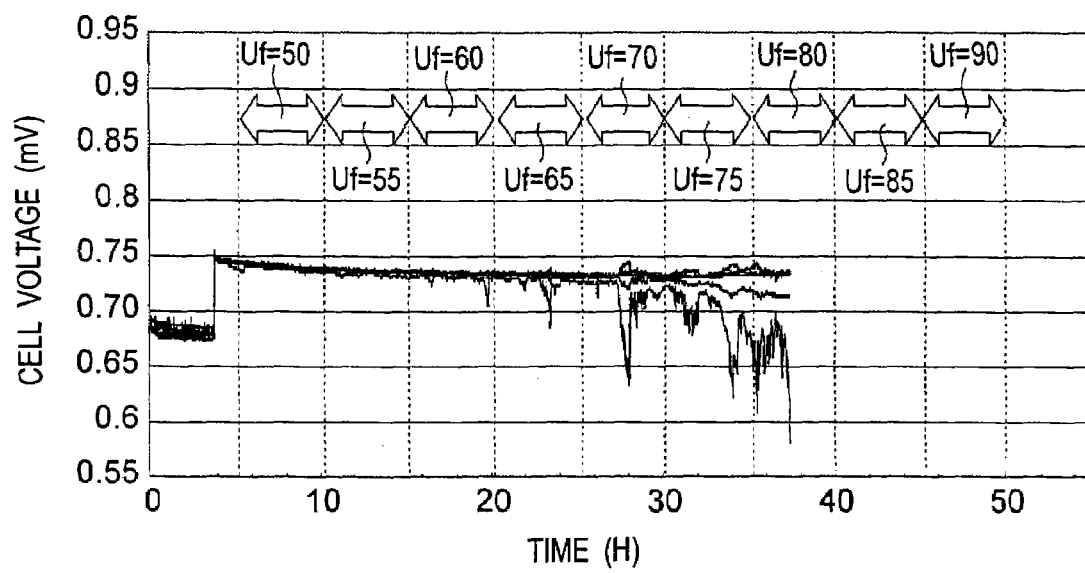
FIG. 19 is a graph showing fuel efficiency characteristics of the fuel cell according to Comparative Example 2.

A polymer electrolyte fuel cell including the fuel-cell stack of Comparative Example 2 fabricated in this way was subjected to measurement of anti-flooding property, mean pressure loss and standard deviation in unit cells and pressure loss of the fuel cell under the conditions of Example 1. The results are shown in Table 3. Further, data as to measurement results of Uf characteristics in the fuel cell of this Comparative Example 2 are shown in FIG. 19. In addition, in the graph of FIG. 19, the vertical axis represents cell voltage and the horizontal axis represents time.

TABLE 2

| Placement direction | GDL-1 Weft | GDL-1 Warp | GDL-2 Weft | GDL-2 Warp | GDL-1 Weft and Warp at random | GDL-2 Weft and Warp at random |
|---|---|---|---|---|---|---|
| Mean | 6.11% | 3.04% | 6.08% | 3.01% | 4.58% | 4.55% |
| Standard deviation | 1.05% | 0.32% | 0.88% | 0.19% | 1.75% | 1.69% |
| Maximum | 7.8% | 3.6% | 7.3% | 3.3% | 7.8% | 7.3% |
| Ratio of Max. to mean | 28% | 18% | 20% | 10% | 70% | 61% |
| Minimum | 4.4% | 2.5% | 4.8% | 2.7% | 2.4% | 2.7% |
| Ratio of Min. to mean | 28% | 18% | 20% | 10% | 48% | 41% |
| (Max.) − (Min.) | 3.4% | 1.1% | 2.5% | 0.6% | 5.4% | 4.6% |
| S/N ratio | 15.3 dB | 19.5 dB | 16.8 dB | 23.9 dB | 8.3 dB | 8.6 dB |

TABLE 3

| | Directional relationship between warp and gas flow passages | Pressure loss in unit cell | | | | Pressure loss of fuel cell | | Anti-flooding property | |
| --- | --- | --- | --- | --- | --- | --- | --- | --- | --- |
| | | Anode side | | Cathode side | | | | Limit | Limit |
| | | Mean | Standard deviation | Mean | Standard deviation | Anode | Cathode | Uf(%) | Uo(%) |
| Example 1 | Parallel | 10.68 | 0.22 | 9.11 | 0.18 | 10.8 | 9.3 | 80 | 50 |
| Example 2 | Perpendicular | 9.55 | 0.17 | 8.71 | 0.13 | 9.7 | 8.8 | 85 | 55 |
| Example 3 | Parallel | 9.77 | 0.18 | 8.80 | 0.14 | 9.9 | 8.9 | 85 | 55 |
| Example 4 | Perpendicular | 9.48 | 0.15 | 8.69 | 0.11 | 9.6 | 8.6 | 90 | 60 |
| Comparative Example 1 | Random | 10.01 | 0.55 | 8.90 | 0.27 | 10.2 | 9.1 | 70 | 35 |
| Comparative Example 2 | Random | 10.01 | 0.55 | 8.90 | 0.27 | 10.2 | 9.1 | 75 | 40 |

None:
"Random" means a state that perpendicular and parallel placement was mixed at a ratio of 1:1.

As apparent from Table 3, in the fuel cells of Comparative Examples 1 and 2, the pressure loss variations among the 50 cells found larger as shown by the standard deviations, where the limit Uf and the limit Uo were lower ones, resulting in degraded anti-flooding property. As for the reason of this, since the elongation variations in the direction perpendicular to the primary direction of the gas flow passages in the carbon fiber woven cloth of the gas-diffusion-layer base material were as relatively large as within ±48% or within ±41%, the variations in the sagging amount of the gas-diffusion-layer base material into the gas flow passages among the cells resulted in larger ones.

In Examples 1 to 4, on the other hand, the elongation variations in the direction perpendicular to the primary direction of the gas flow passages in the carbon fiber woven cloth of the gas-diffusion-layer base material were as relatively large as within ±28%, within ±18%, within ±20% or within ±10%, so that variations in the sagging amount of the gas-diffusion-layer base material into the gas flow passages among the cells were suppressed to relatively small ones. As a result, pressure loss variations (i.e. standard deviations) of the gas flow passages among the cells can be suppressed to lower ones as shown in Table 3, so that the limit Uf and the limit Uo can be increased and the anti-flooding property can be improved.

Indeed, such a tendency toward the improvement of the anti-flooding property as shown above appeared in common to Examples 1 to 4. However, in particular, in the fuel cell of Example 2, since the respective gas-diffusion-layer base materials were so placed that the direction of warp of the carbon fiber woven cloth, i.e. the direction of smaller elongations, would be perpendicular to the primary direction of the gas flow passages, the sagging amounts of the gas-diffusion-layer base materials into the gas flow passages were smaller than those of Example 1, so that the pressure loss variations among the 50 cells as well were further smaller than those of Example 1. Consequently, it was confirmed that the anti-flooding property can be further improved.

Also, in the fuel cells of Examples 3 and 4, in which the gas-diffusion-layer base material GDL-2 being smaller in elongation variation than the gas-diffusion-layer base material GDL-1 used in Examples 1 and 2 was used, variations in the sagging amount of the gas-diffusion-layer base material into the gas flow passages were able to be reduced further in Example 3 than in Example 1, and further in Example 4 than in Example 2, making it confirmed that the anti-flooding property can be further improved.

Figure 22:
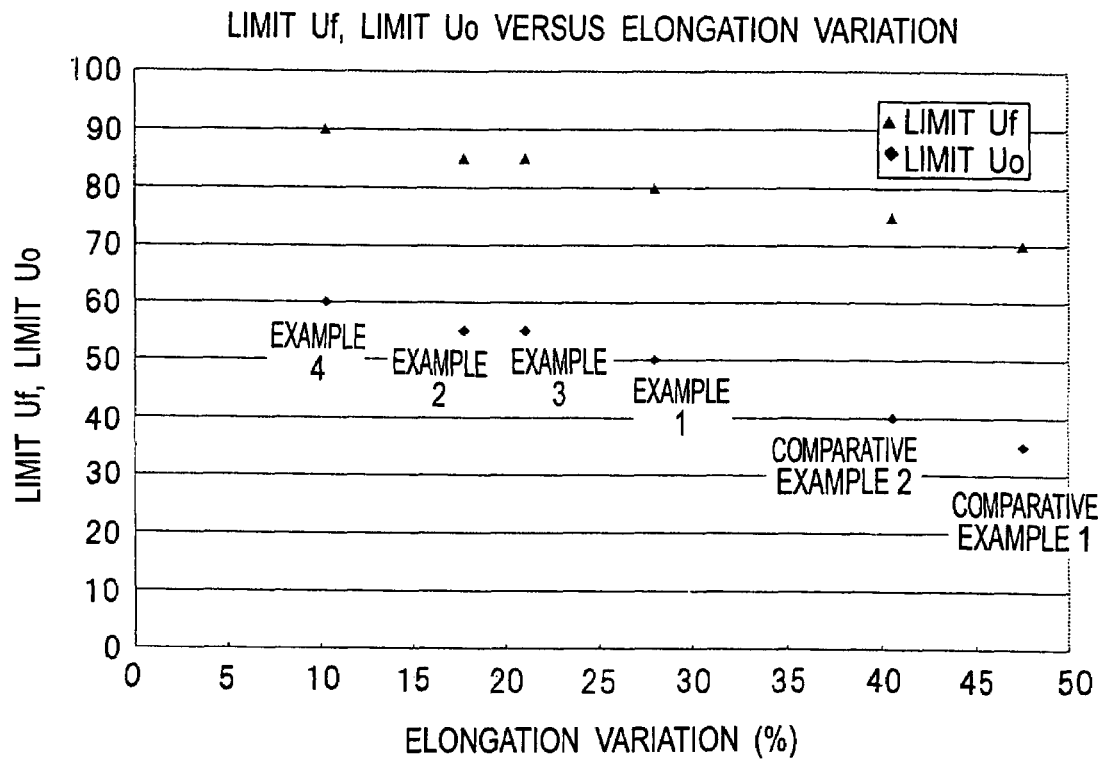
FIG. 22 is a graph showing relationships of a limit Uf and a limit Uo with elongation variations among the cells of the gas-diffusion-layer base material in the respective fuel cells of Examples and Comparative Examples.

Based on such measurement results as shown above, a graph showing a relationship between variations (%) among the cells in the elongation of the carbon fiber woven cloth in the primary direction of the gas flow passages of the separator, or in the direction perpendicular thereto, and the limits Uf (%) and Uo (%) in the fuel cells is shown in FIG. 22. As apparent from FIG. 22, it can be understood that results of limit Uf=80% or more and limit Uo=50% or more can be achieved on condition that the elongation variations in the primary direction or in the direction perpendicular to the primary direction are within ±30%, and moreover that results of limit Uf=85% or more and limit Uo=55% or more can be achieved on condition that the elongation variations in the primary direction or in the direction perpendicular to the primary direction are within ±20%. Further, if the elongation variations in the direction perpendicular to the primary direction are within ±10%, results of limit Uf=90% or more and limit Uo=60% or more can be achieved, which can be said to be more preferable. Consequently, setting the elongation variations to within ±30% allows the anti-flooding property in the fuel cell to be improved, and setting the elongation variations to within ±20%, more preferably to within ±10%, allows the anti-flooding property to be further improved.

Figure 23:
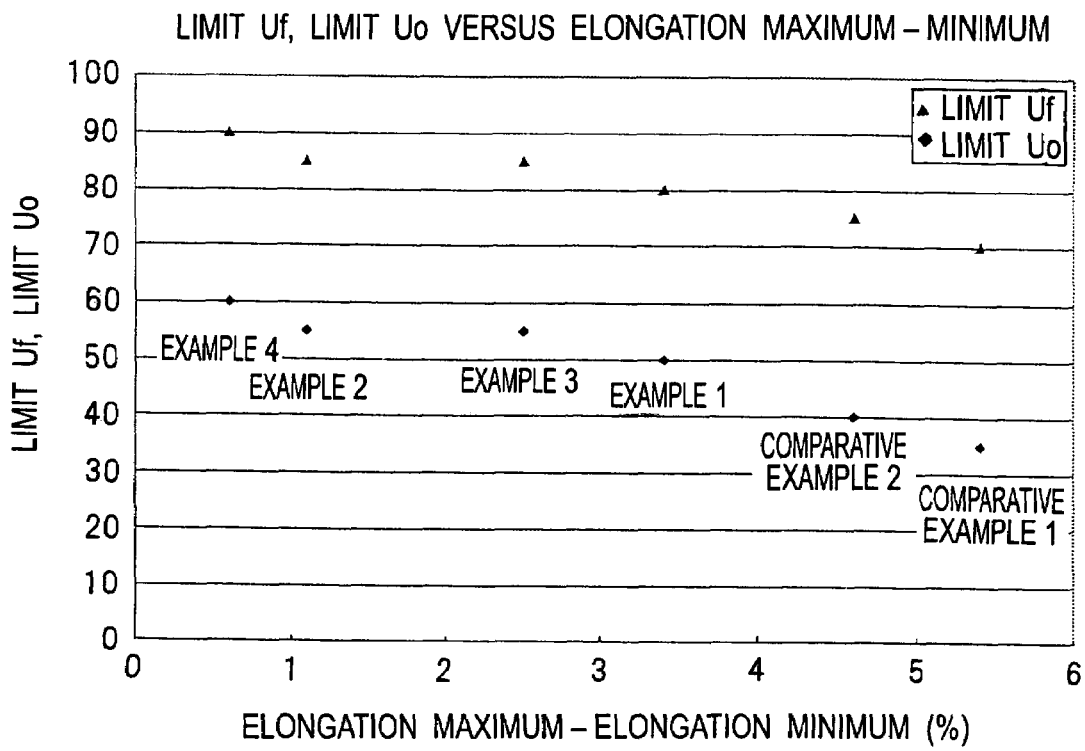
FIG. 23 is a graph showing relationships of the limit Uf and the limit Uo with differences between maximum elongation and minimum elongation of the gas-diffusion-layer base material in the respective fuel cells of Examples and Comparative Examples.

Further, based on the measurement results described above, a graph showing a relationship between a difference (%) between elongation maximum and elongation minimum of the carbon fiber woven cloth in the primary direction of the gas flow passages of the separator, or in the direction perpendicular to the primary direction, and the limits Uf (%) and Uo (%) in the fuel cells is shown in FIG. 23. As apparent from FIG. 23, it can be understood that results of limit Uf=80% or more and limit Uo=50% or more can be achieved on condition that the difference between elongation maximum and minimum in the primary direction or in the direction perpendicular to the primary direction is within 3.5%, and moreover that results of limit Uf=85% or more and limit Uo=55% or more can be achieved on condition that the difference is within 2.5%. Further, if the elongation difference between elongation maximum and minimum in the direction perpendicular to the primary direction is within 1%, results of limit Uf=90% or more and limit Uo=60% or more can be achieved, which can be said to be more preferable. Consequently, setting the difference between elongation maximum and minimum to within 3.5% allows the anti-flooding property in the fuel cell to be improved, and setting the difference to within 2.5%, more preferably to within 1%, allows the anti-flooding property to be further improved.

Figure 24:
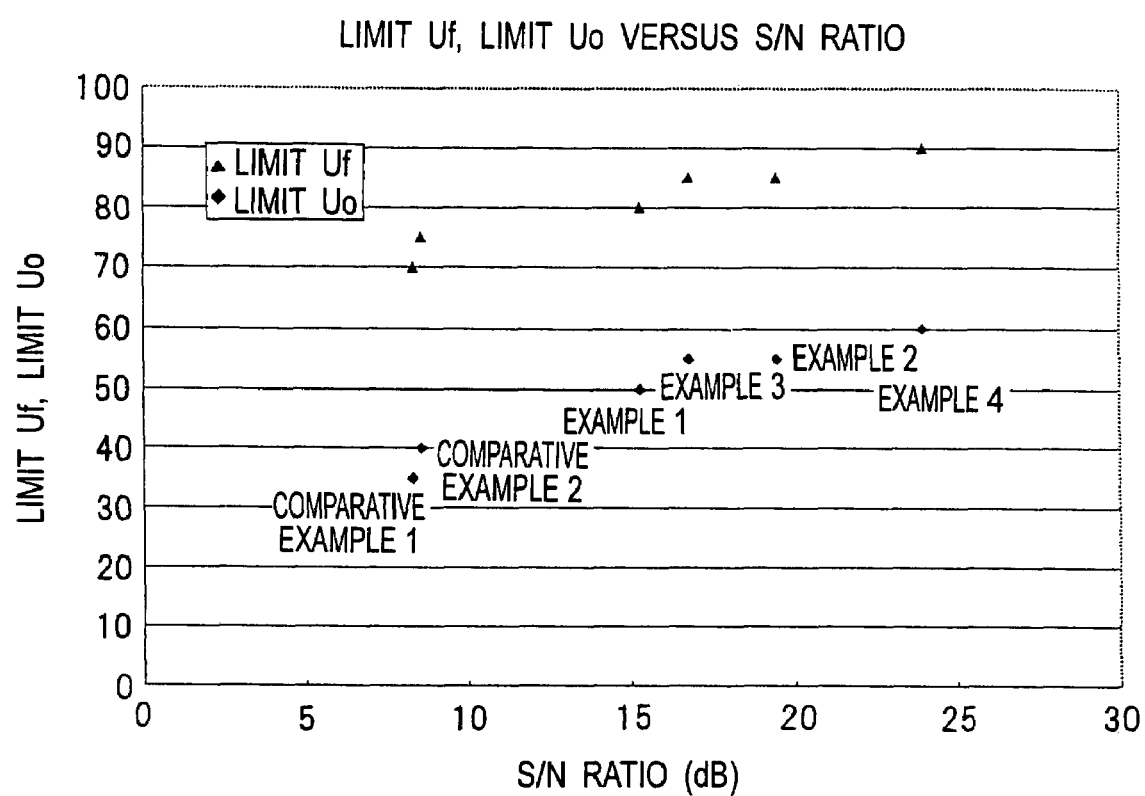
FIG. 24 is a graph showing relationships of the limit Uf and the limit Uo with elongation SN values of the gas-diffusion-layer base material in the respective fuel cells of Examples and Comparative Examples.

Further, based on the measurement results described above, a graph showing a relationship between an S/N ratio (dB) of the carbon fiber woven cloth in the direction perpendicular to the primary direction of the gas flow passages of the separator, and the limits Uf (%) and Uo (%) in the fuel cells is shown in FIG. 24. As apparent from FIG. 24, it can be understood that results of limit Uf=80% or more and limit Uo=50% or more can be achieved on condition that the elongation S/N ratio is 15 dB or more, and moreover that results of limit Uf=85% or more and limit Uo=55% or more can be achieved on condition that the S/N ratio is 20 dB or more. Consequently, setting the elongation S/N ratio to 15 dB or more allows the anti-flooding property in the fuel cell to be improved, and setting the S/N ratio to 20 dB or more allows the anti-flooding property to be further improved.

In addition, in a case where the relationship in elongation between the placement direction of warp and the placement direction of weft in the carbon fiber woven cloth has an anisotropy that the elongation in the large-elongation direction is 60% or more larger than the smaller-elongation elongation, setting a placement in which the placement direction of warp and the placement direction of weft are mixed together in the direction perpendicular to the primary direction of the gas flow passages among the individual cells would cause the elongation variations among the cells to go beyond ±30%, apparently. Therefore, in such a case, it is preferred to set the placement direction of the carbon fiber woven cloth along either the placement direction of warp or the placement direction of weft uniformly among the cells.

The above embodiments have been described on a case where the fuel-cell stack includes a plurality of cells. However, such a stack has only to include at least two cells such as a first cell and a second cell to obtain the effects by this embodiment.

In addition, as the number of cells in the stack increases more and more, the gas distribution tends to worsen for cells having extremely different pressure losses in the stack, where the issue of flooding could be considerable. For example, in a fuel cell for use of household cogeneration, the power generation voltage of the stack is set to at least 10 V or more in order to ensure the inverter power, in which case a number of cells counting 10 cells or more is required for such a stack. In fuel-cell stacks having a 10 or more-cell construction, the effects by the present invention can be obtained more efficiently.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2005-007377 filed on Jan. 14, 2005, including specification, drawings, and claims, are incorporated herein by reference in its entirety.

INDUSTRIAL APPLICABILITY

The fuel-cell stack and the fuel cell of the present invention, by the setting that the fiber direction of the gas-diffusion-layer base material is uniformized with respect to the direction perpendicular to the gas flow passages among all the cells, are capable of reducing elongation variations of the gas-diffusion-layer base material in the direction perpendicular to the gas flow passages among the cells and, as a result, reducing pressure loss variations among the cells, making it achievable to improve the anti-flooding property. Thus, the invention is applicable to fuel cells which directly use, as a fuel, pure hydrogen or modified hydrogen derived from fossil fuels or the like, or liquid fuels such as methanol and ethanol and which use air or oxygen as an oxidizer.

The invention claimed is:

1. A fuel-cell stack, comprising:
   a layer-stacked structure of a first cell and a second cell, wherein each cell includes
      a membrane electrode assembly having a polyelectrolyte membrane, and an anode and a cathode arranged so as to sandwich the polyelectrolyte membrane, wherein the anode and the cathode each comprise a catalytic layer formed on a surface of the polyelectrolyte membrane and a gas diffusion layer formed on an outer surface of the catalytic layer, and
      a pair of separators having groove portions formed on surfaces thereof, the separators being arranged so as to interpose the membrane electrode assembly therebetween and so as to form gas flow passages by bringing the surfaces having the grooved portions into contact with the gas diffusion layers, respectively,
   wherein each gas diffusion layer includes a gas-diffusion-layer base material, wherein (a) the gas-diffusion-layer base material of each anode of the first and second cells comprises a first direction and an elongation such that the gas-diffusion-layer base materials have elongation variations that are different in the anode of the first cell and the anode of the second cell in the first direction, or (b) the gas-diffusion-layer base material of each cathode of the first and second cells comprises a first direction and an elongation such that the gas-diffusion-layer base materials have elongation variations that are different in the cathode of the first cell and the cathode of the second cell in the first direction,
   wherein the first direction is both (i) parallel to the surfaces having the grooved portions and (ii) perpendicular to a primary direction of flow in the gas flow passages.

2. The fuel-cell stack as defined in claim 1, wherein the elongation variations of the gas-diffusion-layer base material of the gas diffusion layers of each of the anodes of the first and second cells are within ±30% of each other with respect to the first direction.

3. The fuel-cell stack as defined in claim 1, wherein the elongation variations of the gas-diffusion-layer base material of the gas diffusion layers of each of the anodes of the first and second cells are within ±30% of each other with respect to the first direction, and wherein the elongation variations of the gas-diffusion-layer base material of the gas diffusion layers of each of the cathodes of the first and second cells are within ±30% of each other with respect to the first direction.

4. The fuel-cell stack as defined in claim 1, wherein the elongation variations are within ±30% of each other with respect to a second direction which is both (i) parallel to the surfaces having the grooved portions and (ii) parallel to the primary direction of flow in the gas flow passages.

5. The fuel-cell stack as defined in claim 1, wherein the elongation variations are within ±10% of each other with respect to the first direction.

6. The fuel-cell stack as defined in claim 5, wherein the elongation variations are within ±20% of each other with respect to a second direction which is both (i) parallel to the surfaces having the grooved portions and (ii) parallel to the primary direction of flow in the gas flow passages.

7. The fuel-cell stack as defined in claim 1, wherein elongations of each of the gas-diffusion-layer base materials of the first and second cells are anisotropic with respect to the first direction, and with respect to a second direction which is both (i) parallel to the surfaces having the grooved portions and (ii) parallel to the primary direction of flow in the gas flow passages.

8. The fuel-cell stack as defined in claim 7, wherein the anisotropic elongations are such that an elongation in one of the first and second directions is 60% or more larger than an elongation in the other of the first and second directions.

9. The fuel-cell stack as defined in claim 7, wherein the anisotropic elongations are such that an elongation in the first direction is smaller than an elongation in the second direction.

10. The fuel-cell stack as defined in claim 1, wherein the gas-diffusion-layer base materials are formed from carbon fiber woven cloth.

11. A fuel cell comprising:
the fuel-cell stack as defined in claim 1; and
a fuel supply unit for feeding both the first cell and the second cell of the stack.

12. The fuel-cell stack as defined in claim 1, wherein the gas-diffusion-layer base materials are formed from carbon fiber nonwoven cloth.

13. The fuel-cell stack as defined in claim 1, wherein the elongation variations of the gas-diffusion-layer base material of the gas diffusion layers of each of the cathodes of the first and second cells are within ±30% of each other with respect to the first direction.

* * * * *

UNITED STATES PATENT AND TRADEMARK OFFICE
CERTIFICATE OF CORRECTION

PATENT NO. : 7,632,589 B2
APPLICATION NO. : 11/795021
DATED : December 15, 2009
INVENTOR(S) : Tsutomu Kawashima et al.

It is certified that error appears in the above-identified patent and that said Letters Patent is hereby corrected as shown below:

On the Title Page

In Section (56) References Cited, under the "OTHER PUBLICATIONS" heading, please insert the following reference:

--Patent Cooperation Treaty (PCT) International Preliminary Report on Patentability, issued July 17, 2007 in International Application No. PCT/JP2006/300334.--

Signed and Sealed this

Twenty-first Day of September, 2010

David J. Kappos
*Director of the United States Patent and Trademark Office*